(12) United States Patent
Iguchi et al.

(10) Patent No.: US 8,953,234 B2
(45) Date of Patent: Feb. 10, 2015

(54) IMAGE PROCESSING APPARATUS, IMAGE PROCESSING METHOD, AND PRINTER

(75) Inventors: Ryosuke Iguchi, Kawasaki (JP); Nobutaka Miyake, Yokohama (JP); Tohru Ikeda, Yokohama (JP); Akitoshi Yamada, Yokohama (JP); Mitsuhiro Ono, Tokyo (JP); Fumitaka Goto, Tokyo (JP); Hidetsugu Kagawa, Kawasaki (JP); Tomokazu Ishikawa, Kawasaki (JP); Junichi Nakagawa, Tokyo (JP); Senichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1042 days.

(21) Appl. No.: 12/966,743

(22) Filed: Dec. 13, 2010

(65) Prior Publication Data
US 2012/0081768 A1 Apr. 5, 2012

(30) Foreign Application Priority Data

Oct. 5, 2010 (JP) ................. 2010-225748

(51) Int. Cl.
*H04N 1/46* (2006.01)
*H04N 1/54* (2006.01)
(Continued)

(52) U.S. Cl.
CPC .......... *H04N 1/6033* (2013.01); *H04N 1/4015* (2013.01); *H04N 1/6041* (2013.01)
USPC ........... 358/518; 358/501; 358/502; 358/504; 358/523; 358/401; 358/1.9; 358/1.5; 358/3.06; 358/3.12; 347/12; 347/13; 347/19; 347/42; 347/47; 347/78; 347/188; 347/254

(58) Field of Classification Search
CPC ...... B41J 2/362; H04N 1/6038; H04N 1/6041
See application file for complete search history.

(56) References Cited

U.S. PATENT DOCUMENTS 6,025,929 A 2/2000 Nakajima et al.
6,646,760 B1 11/2003 Hanihara
(Continued)

FOREIGN PATENT DOCUMENTS

CN 1234533 1/2006
CN 1874895 12/2006
(Continued)

OTHER PUBLICATIONS

U.S. Appl. No. 12/966,823, filed Dec. 13, 2010. Applicants: Akitoshi Yamada, et al.
(Continued)

*Primary Examiner* — Beniyam Menberu
(74) *Attorney, Agent, or Firm* — Fitzpatrick, Cella, Harper & Scinto

(57) ABSTRACT

An image processing apparatus is provided that is capable of very accurately and efficiently reducing uneven color caused by variation in ejection characteristics among nozzles that eject ink and that occurs in a color image that is formed by mixing a plurality of different kinds of ink. A patch is printed by ejected ink from a plurality of nozzles, a region is specified so as to perform color correction in a test color image that is printed on a printing medium, a plurality of different color correction processing is performed on color signals that correspond to a color correction region, a plurality of color correction patches are printed, a color correction patch to be used is selected from among the plurality of different color correction patches and table parameters that correspond to the nozzles are created based on the selected color correction processing.

29 Claims, 15 Drawing Sheets

(51) Int. Cl.
*H04N 1/60* (2006.01)
*H04N 1/405* (2006.01)
*G03F 3/00* (2006.01)
*G06K 15/02* (2006.01)
*B41J 2/135* (2006.01)
*B41J 2/14* (2006.01)
*H04N 1/401* (2006.01)

(56) References Cited

U.S. PATENT DOCUMENTS

| | | | |
|---|---|---|---|
| 6,726,303 B2 * | 4/2004 | Otsuki | 347/19 |
| 6,814,420 B2 | 11/2004 | Fujita et al. | |
| 6,953,238 B2 | 10/2005 | Koitabashi et al. | |
| 7,034,844 B2 | 4/2006 | Akiyama et al. | |
| 7,075,679 B2 | 7/2006 | Goto et al. | |
| 7,079,152 B2 | 7/2006 | Akiyama et al. | |
| 7,145,693 B2 | 12/2006 | Kagawa | |
| 7,239,402 B2 | 7/2007 | Soler et al. | |
| 7,266,239 B2 | 9/2007 | Akiyama et al. | |
| 7,274,491 B2 | 9/2007 | Yamada et al. | |
| 7,339,703 B2 | 3/2008 | Kagawa | |
| 7,342,684 B2 | 3/2008 | Imafuku et al. | |
| 7,411,707 B2 | 8/2008 | Ikeda | |
| 7,570,402 B2 | 8/2009 | Yoshida | |
| 7,639,399 B2 | 12/2009 | Ikeda | |
| 7,643,178 B2 | 1/2010 | Yamada et al. | |
| 7,684,063 B2 | 3/2010 | Fujita et al. | |
| 7,750,921 B2 | 7/2010 | Akiyama et al. | |
| 7,912,280 B2 | 3/2011 | Miyagi et al. | |
| 8,616,668 B2 * | 12/2013 | Saito et al. | 347/15 |
| 2004/0233484 A1 * | 11/2004 | Seko et al. | 358/523 |
| 2005/0212814 A1 * | 9/2005 | Kubo | 345/614 |
| 2006/0044334 A1 * | 3/2006 | Fujita et al. | 347/12 |
| 2006/0066927 A1 | 3/2006 | Tanaka | |
| 2006/0197998 A1 * | 9/2006 | Shibuya et al. | 358/518 |
| 2007/0146752 A1 | 6/2007 | Iguchi | |
| 2008/0056567 A1 * | 3/2008 | Kwon et al. | 382/168 |
| 2008/0144060 A1 | 6/2008 | Ishikawa | |
| 2008/0239353 A1 | 10/2008 | Hori et al. | |
| 2008/0239355 A1 | 10/2008 | Goto et al. | |
| 2008/0239410 A1 | 10/2008 | Hashii et al. | |
| 2008/0284808 A1 * | 11/2008 | Kano et al. | 347/12 |
| 2009/0034837 A1 * | 2/2009 | Kato et al. | 382/167 |
| 2009/0034838 A1 | 2/2009 | Umeda et al. | |
| 2010/0013878 A1 * | 1/2010 | Spaulding et al. | 347/9 |
| 2010/0053653 A1 | 3/2010 | Hatori et al. | |
| 2010/0156980 A1 * | 6/2010 | Azuma et al. | 347/14 |
| 2010/0321437 A1 * | 12/2010 | Ogama | 347/14 |
| 2011/0038020 A1 | 2/2011 | Kagawa | |

FOREIGN PATENT DOCUMENTS

| | | |
|---|---|---|
| CN | 101662571 | 3/2010 |
| EP | 1310373 A2 | 5/2003 |
| JP | 10-13674 | 1/1998 |
| JP | 2000-0083157 A | 3/2000 |
| JP | 2003-134349 A | 5/2003 |
| JP | 2004-276266 A | 10/2004 |
| JP | 2005-219321 A | 8/2005 |
| JP | 2007190862 A | 8/2007 |
| JP | 2007-320240 A | 12/2007 |

OTHER PUBLICATIONS

U.S. Appl. No. 12/966,781, filed Dec. 13, 2010. Applicants: Fumitaka Goto, et al.
U.S. Appl. No. 12/966,799, filed Dec. 13, 2010. Applicants: Tomokazu Ishikawa, et al.
U.S. Appl. No. 12/962,895, filed Dec. 8, 2010. Applicants: Junichi Nakagawa, et al.
U.S. Appl. No. 12/962,889, filed Dec. 8, 2010. Applicants: Hiroyuki Sakai, et al.
U.S. Appl. No. 12/962,875, filed Dec. 8, 2010. Applicants: Kiyoshi Umeda, et al.
U.S. Appl. No. 12/966,757, filed Dec. 13, 2010. Applicants: Makoto Torigoe, et al.
U.S. Appl. No. 12/966,848, filed Dec. 13, 2010. Applicants: Senichi Saito, et al.
U.S. Appl. No. 12/966,265, filed Dec. 13, 2010. Applicants: Nobutaka Miyake, et al.
U.S. Appl. No. 12/966,837, filed Dec. 13, 2010. Applicants: Mitsuhiro Ono, et al.
U.S. Appl. No. 13/019,253, filed Feb. 1, 2011. Applicants: Arata Miyagi, et al.
U.S. Appl. No. 12/966,769, filed Dec. 13, 2010. Applicants: Tohru Ikeda, et al.
Extended European Search Report dated Sep. 16, 2013 in European Patent Application No. 11006723.8.
Chinese Office Action dated Dec. 25, 2013 in counterpart Chinese Patent Appl. No. 201110029410.5.

* cited by examiner

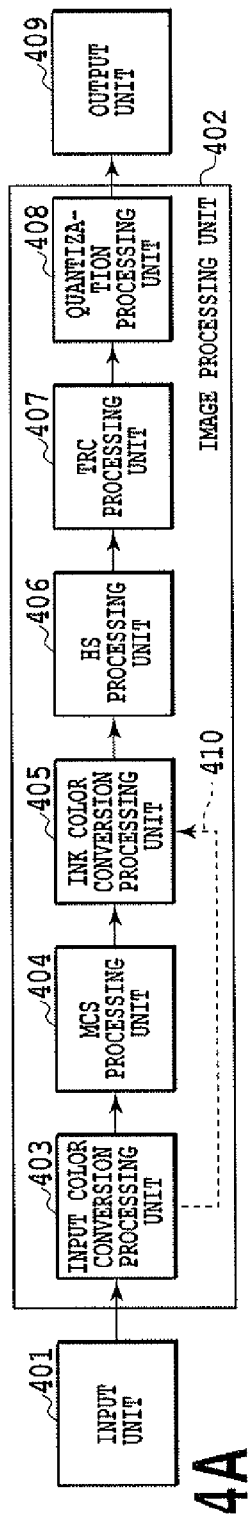
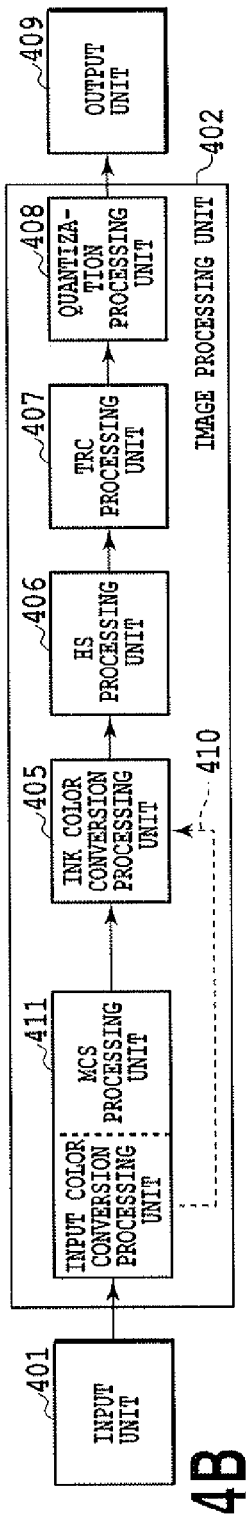
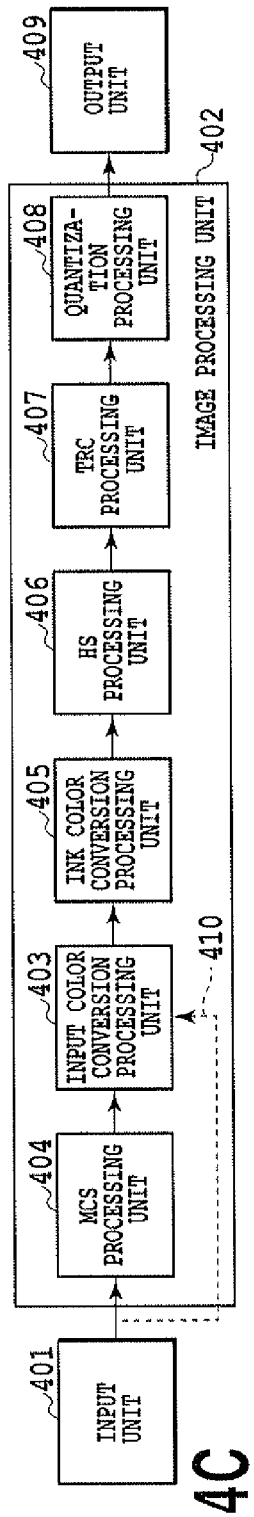
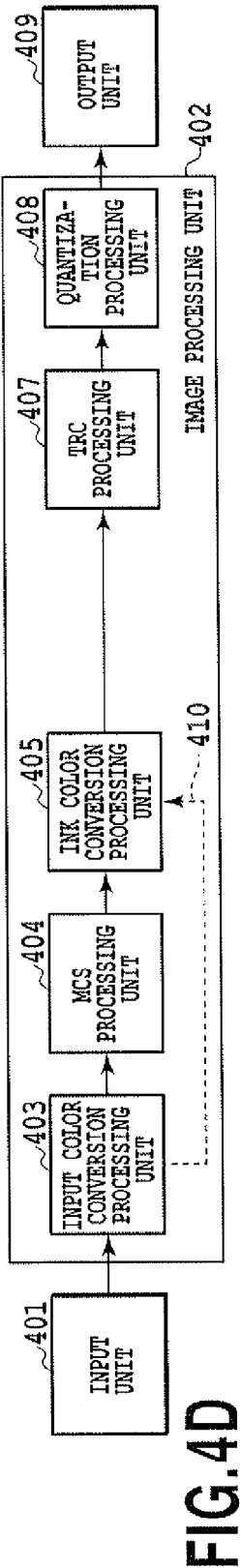
FIG.4A
FIG.4B
FIG.4C
FIG.4D

IMAGE PROCESSING APPARATUS, IMAGE PROCESSING METHOD, AND PRINTER

BACKGROUND OF THE INVENTION

1. Field of the Invention

The present invention relates to an image processing apparatus, an image processing method, and a printer.

2. Description of the Related Art

A plurality of ink ejection nozzles designed to eject the same ejection amount practically eject different ejection amounts due to manufacturing variations. Accordingly, when the plurality of ejection nozzles are used to form an image on a printing medium with the number of uniform printing dots, a density variation due to the manufacturing variations and the like may occur. Japanese Patent Laid-Open No. H10-013674 (1998) discloses a head shading technique that, in order to settle the density variation, acquires information on ink amounts ejected from respective ink ejection nozzles, and according to the information on ink amounts, modulates the number of printing dots.

Meanwhile, even in the case of using the head shading technique as described above, when two or more inks are superimposed to perform color reproduction, a phenomenon in which color development in a region where printing is performed with nozzles having different ejection amounts from a standard one is different from a color that should have been printed, i.e., a so-called color shift occurs. That is, only by the head shading technique, even if density unevenness of a single color image is corrected, on an image expressed by superimposing two or more inks, the color shift may occur according to a variation in ejection characteristic among a plurality of nozzles. If the ejection characteristic is different among the plurality of nozzles, a degree of the color shift is different between printed regions, and this is recognized as color unevenness.

When colorimetry of the occurrence site of such color unevenness is performed with a colorimeter, a colorimetric error may occur. For example, a spectrophotometric colorimeter performs the colorimetry by reading reflected light within a certain spot diameter. However, color unevenness in a region having a width smaller than the spot diameter, up to in a region surrounding the color unevenness, is read by the spectrophotometric colorimeter. For this reason, it is difficult to accurately perform the colorimetry of the color unevenness. Also, in the case of an image input device such as a scanner, there are some cases where metamerism occurs depending on a degree of accuracy of a sensor, where color difference cannot be discriminated depending on the number of bits upon generation of an input image, and others, i.e., human visual accuracy may not be reproducible.

SUMMARY OF THE INVENTION

An object of the present invention is to provide an image processing apparatus, printer, and image processing method being capable of accurately and efficiently reducing color unevenness in a color image, which is formed by color mixture of a plurality of different types of inks due to a variation in ejection characteristic among nozzles that eject the inks.

The present invention provides an image processing apparatus that performs color correction processing for a color signal that is associated with each pixel of image data to be printed on a printing medium and includes a plurality of components in a predetermined color space, the image processing apparatus includes a memory configured to store a conversion table having a plurality of table parameters, each of the table parameters being assigned for each of a nozzle or a predetermined number of nozzles used for printing in a common region of the printing medium in a plurality of nozzle arrays, respectively, the plurality of nozzle arrays ejecting a plurality of inks including a first ink and a second ink having a different color from the first ink; a correction unit configured to perform the color correction processing of the color signal using at least one of the table parameters assigned to a nozzle corresponding to the color signal of the each pixel; a first output unit configured to output a signal that causes the plurality of nozzle arrays to eject at least both of the first and second inks in a common region of the printing medium so as to print a test color image; a first reception unit configured to receive information on a color correction region to be subjected to color correction in the test color image, the information being based on a result of the output of the test color image output by the first output unit; a generation unit configured to generate a plurality of correction candidate values used for the color correction processing for at least one of the color signals corresponding to the color correction region in the test color image; a second output unit configured to output a signal that causes the plurality of nozzle arrays to print a plurality of different color correction images on the printing medium, the a plurality of different color correction images being subjected to a plurality of different types of color correction processing with use of the plurality of correction candidate values; a second reception unit configured to receive information on a color correction image selected from the plurality of different color correction images, the information being based on a result of the output of the plurality of different color correction images output by the second output unit; and a formation unit configured to form at least one of the table parameters based on the color correction processing corresponding to the selected color correction image, the at least one of the table parameter being assigned to a nozzle corresponding to the color correction region.

Further features of the present invention will become apparent from the following description of exemplary embodiments (with reference to the attached drawings).

BRIEF DESCRIPTION OF THE DRAWINGS

FIGS. 4A to 4D are block diagrams illustrating configurations of image processing units in inkjet printers according to a first embodiment of the present invention and variations of the first embodiment;

DESCRIPTION OF THE EMBODIMENTS

Figure 1:
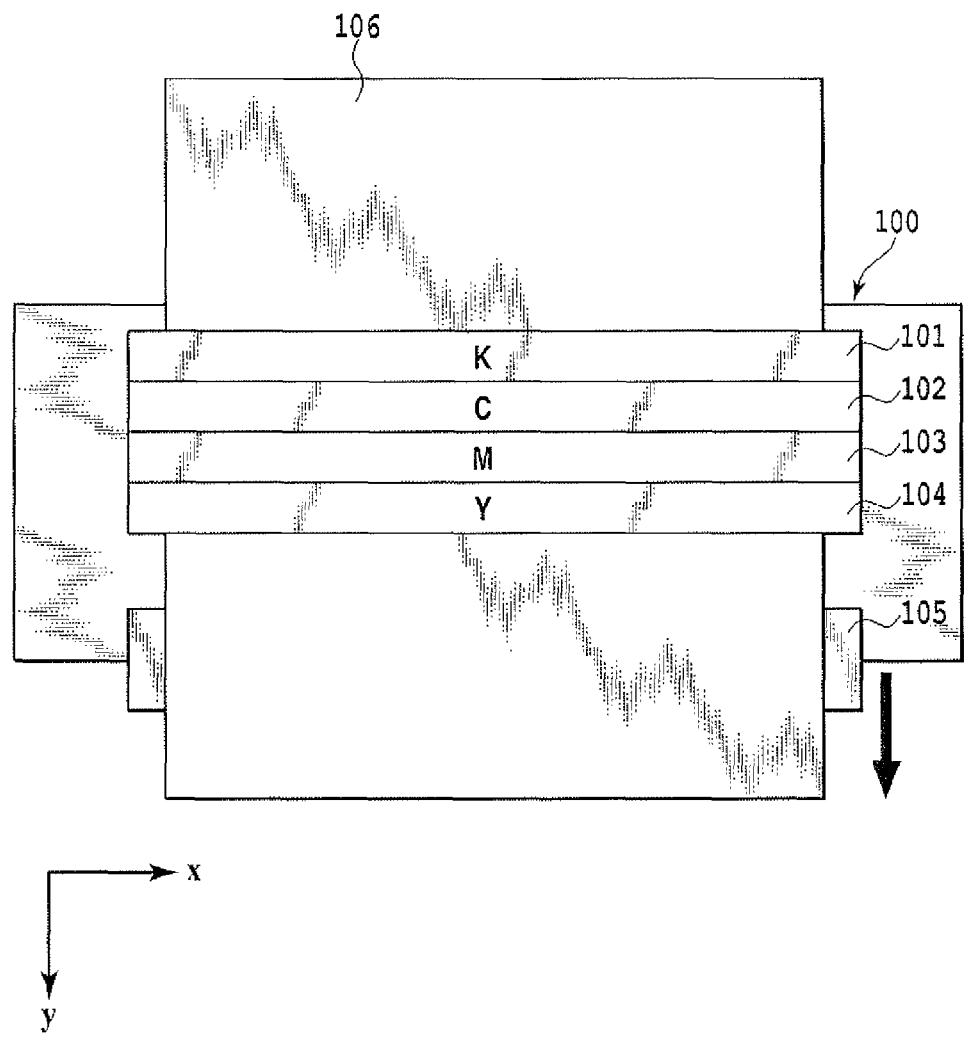
FIG. 1 is a diagram schematically illustrating an inkjet printer according to one embodiment of the present invention.

FIG. 1 is a drawing that schematically illustrates an inkjet printing apparatus (inkjet printing apparatus) of an embodiment of the present invention. As illustrated in FIG. 1, the printer 100 comprises printing heads 101 to 109 in a frame forming the printer. Each of the printing heads 101 to 109 comprises a plurality of nozzles for ejecting black (K), cyan (C), magenta (M) and yellow (Y), with the nozzles being arranged in arrays along the x direction in a range corresponding to the width of printing paper 106, and being the so-called full-line type. The resolution of the nozzle arrangement of nozzles arrays for each color is 1200 dpi.

The printing paper 106 as a printing medium is conveyed in the direction of the y arrow in FIG. 1 by a conveying roller, 105 (and other rollers not illustrated in the figure) that is rotated by the driving force of a motor (not illustrated in the figure). In addition, while the printing paper 106 is being conveyed, ink is ejected from the plurality of nozzles of each of the printing heads 101 to 104 according to printing data. By doing so, one raster portion of an image that corresponds to the nozzle arrays of each of the printing heads is sequentially printed. By repeating this kind of ink ejection operation of ejecting ink from the printing heads onto the conveyed printing paper, it is possible to print an image for one page, for example. The printing apparatus to which the present invention can be applied is not limited to a full-line type apparatus as explained above. For example, from the explanation below, it is clear that the present invention could also be applied to a so-called serial-type printing apparatus that performs printing by scanning the printing heads in a direction orthogonal to the conveyance direction of the printing paper.

Figure 2:
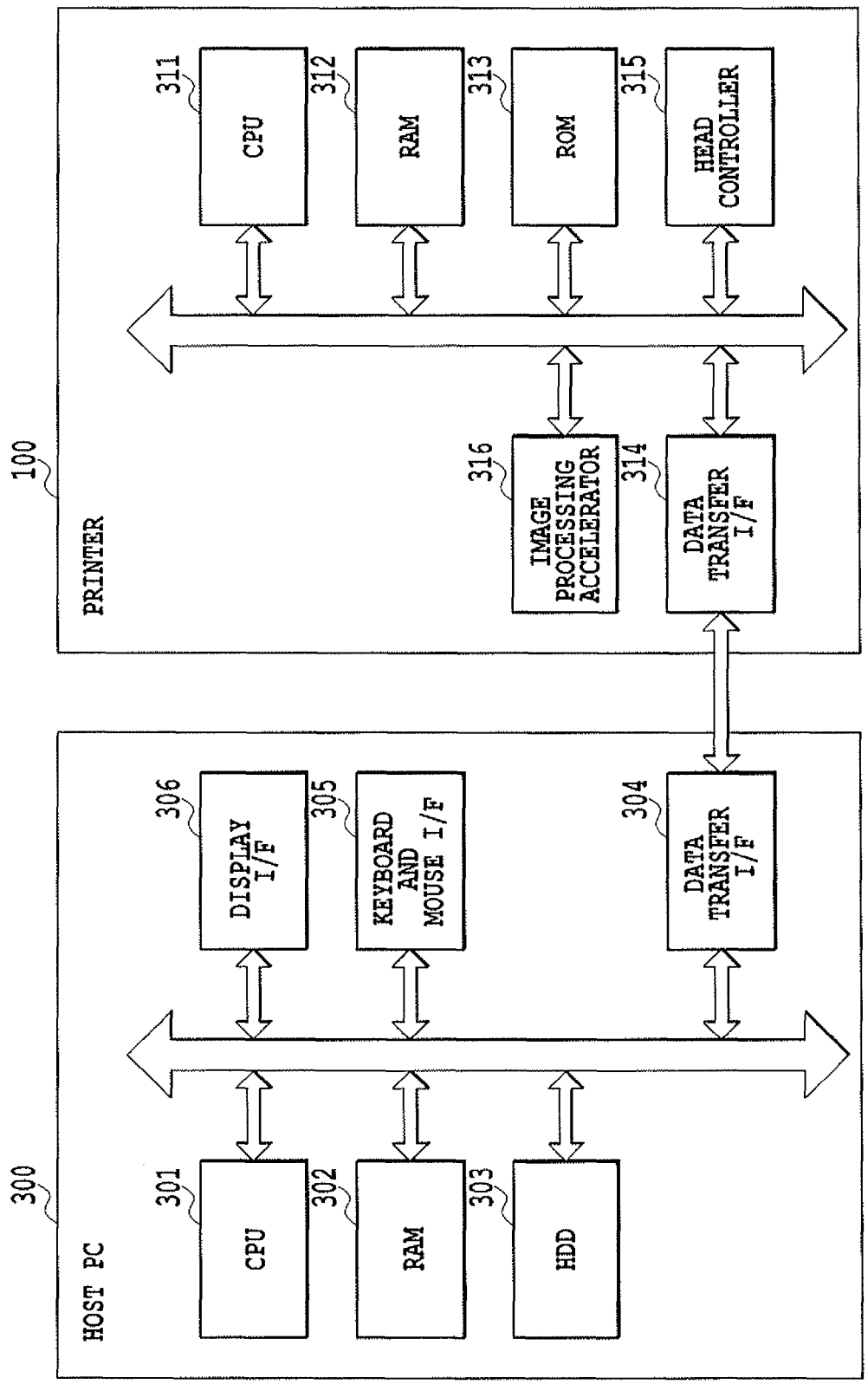
FIG. 2 is a block diagram illustrating a printing system according to one embodiment of the present invention.

FIG. 2 is a block diagram illustrating the construction of a printing system of an embodiment of the present invention. As illustrated in FIG. 2, this printing system comprises the printer 100 illustrated in FIG. 1, and a personal computer (PC) 300 as a host device of the printer 100.

The host PC 300 has the following elements. A CPU 301 executes processing according to programs stored on a HDD 303 or RAM 302. The RAM 302 is volatile storage, and stores programs and data temporarily. The HOD 303 is nonvolatile storage, and similarly stores programs and data. A data transfer I/F (interface) 304 controls transmission and reception of data between the host PC 300 and the printer 100. A USB, IEEE 1394, LAN or the like can be used as the connection method for this data transmission and reception. A keyboard and mouse I/F 305 is an interface controlling Human Interface Devices (HID) such as a keyboard or mouse, and the user can perform input by way of this I/F. A display I/F 306 controls display on a display device (not illustrated in the figure).

On the other hand, the printer 100 has the following elements. A CPU 311 executes the processing of each of the embodiments described later using figures starting from FIG. 4A according to programs stored in ROM 313 and RAM 312. The RAM 312 is volatile storage, and stores programs and data temporarily. The ROM 313 is nonvolatile storage, and can store table data, which is created in the processing of each of the embodiments described later using figures starting from FIG. 4A, and programs.

A data transfer I/F 314 controls transmission and reception of data between the printer 100 and PC 300. A head controller 315 supplies printing data to the printing heads 101 to 104 illustrated in FIG. 1, as well as controls the ink ejection operation of the printing heads. More specifically, the head controller 315 can be constructed to read control parameters and printing data from a specified address in RAM 312. In addition, when the CPU 311 writes control parameters and printing data to the specified address in RAM 312, processing by the head controller 315 is activated and ink ejection from the printing heads is performed. An image processing accelerator 316 is hardware that executes image processing at a higher speed than the CPU 311. That is, the image processing accelerator 316 can be constructed to read parameters and data from a specified address in RAM 312 necessary for image processing. Moreover, when the CPU 311 writes parameter and data to the specified address in RAM 312, the image processing accelerator 316 is activated, and specified image processing is performed. In this embodiment, the CPU 311 through software processing executes a process of creating table parameters that are used by an MCS processing unit in each of the embodiments described in FIG. 4A on. On the other hand, the image processing accelerator 316, through hardware processing, performs image processing during printing that includes the processing by the MCS processing unit. The image processing accelerator 316 is not an essential element, and depending on the printer specifications, the process of creating table parameters and image processing described above can of course be executed by just the CPU 311 through software processing.

An embodiment will be explained below that reduces uneven color that occurs due to variations in the ejection characteristics of the plurality of nozzles when printing an image using a plurality of kinds of ink in the printing system explained above.

Figure 3A:
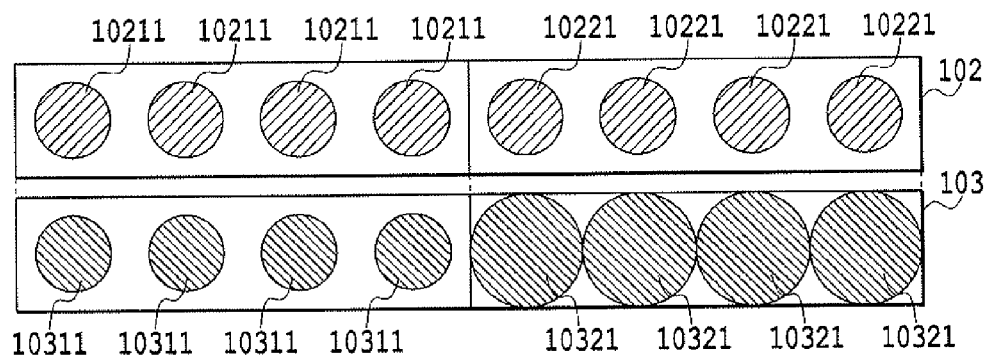
FIGS. 3A to 3C are diagrams for describing color unevenness occurring when a blue image is printed.
Figure 3B:
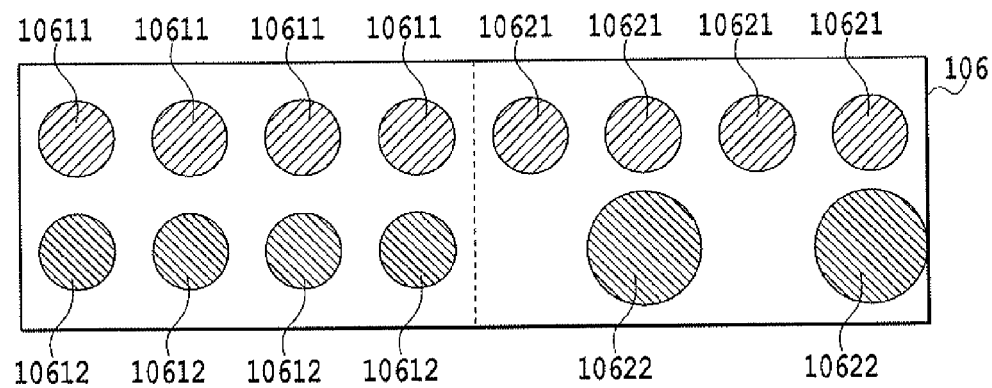
Figure 3C:
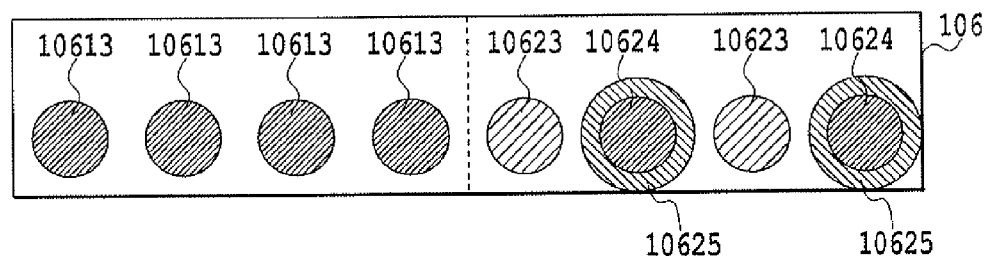

FIG. 3A to FIG. 3C are drawings explaining uneven color that occurs when a blue image, which is expressed by overlapping of two kinds of ink (mixed color), is printed in a state when conventional head shading is performed. In FIG. 3A, reference number 102 is a printing head that ejects cyan ink as a first ink, and reference number 103 is a printing head that ejects magenta ink as a second ink having a color that differs from that of the first ink. In FIG. 3A, in order to simplify the explanation and the drawings, only eight nozzles of the plurality of nozzles in each of the printing heads are illustrated. Moreover, uneven color in the case of printing blue using cyan and magenta ink is explained, so only the two printing heads for cyan and magenta are illustrated.

The eight nozzles 10211 and 10221 of the cyan ink printing head 102 are all capable of ejecting a standard amount of ink in a standard direction, such that dots having the same size are printed at set intervals on the printing medium. On the other hand, the ink ejection direction of all of the eight nozzles of the magenta printing head 103 is also the standard direction, however, the ejection amount of four of the nozzles 10311 on the left side of the figure is the standard amount, but the ejection amount of the four nozzles 10321 on the right side is greater than the standard amount. Therefore, in the region on the left side of the figure (first nozzle area), large magenta dots that are the same size as the cyan dots are printed; however, in the area on the right side (second nozzle area), magenta dots that are larger than the cyan dots are printed at the same set interval as the cyan dots. In FIG. 3A, the four nozzles on the right side of the printing head 103 for, magenta ink are illustrated as a larger size than the four nozzles on the right side; however, this is done in order that the difference in ejection amount can be easily seen, and the relationship of the actual nozzle sizes are not necessarily as illustrated in the figure.

When image data is corrected by conventional head shading when using a printing head having this kind of characteristic of the ejection amount, image data that corresponds to the magenta nozzles 10321 are corrected in the direction that reduces that value. As a result, in order that the number of dots printed by the magenta nozzles 10321 is kept less than the number of dots printed by the magenta nozzle 10311, dot data (binary data) that sets whether to print dots (1) or not print dots (0) is generated.

FIG. 3B illustrates cyan dots 10611 and 10621 that correspond to the cyan ink printing head 102, and magenta dots 10612 and 10622 that correspond to the magenta ink printing head 103. Of these, for the dots 10622 in the area that corresponds to the four nozzles 10321 having a large ejection amount of magenta ink, the image data of the corresponding area is corrected by head shading, and as a result, the number of dots is reduced. The example illustrated in the figure is an example of the case when the surface area of the dots that are formed by the ink ejected from the magenta ink nozzles 10321 having a large ejection amount is twice the surface area of dots resulting from a standard ejection amount. In this case, through correction by head shading, the number of dots is reduced by half (4 dots→2 dots). The reason for making the number of dots ½ when the surface area of the dots is doubled is to simplify the explanation. Actually, of course, the number of dot data is set so that the increase (decrease) in density due to an increase (decrease) in dot surface area caused by variation in the ejection amount is suppressed so that it becomes the standard density.

FIG. 3C illustrates an example of a blue image that is printed by ejecting cyan and magenta ink onto printing paper 106 from the printing heads based on the dot data obtained as described above. In FIG. 3C, cyan ink and magenta ink overlap and form dots on the printing paper 106 in the area on the left side of the figure, with the blue dots 10613 being printed at normal size. On the other hand, in the area on the right side of the figure corresponding to the four nozzles 10321 where the ejection amount of magenta is large, standard size cyan dots 10623, and dots comprising the blue area 10624 that is formed by overlapping cyan ink and magenta ink and the magenta area 10625 surrounding that area are printed.

In this way, the area where blue corresponding to the magenta nozzles 10321 on the right side of the figure where the ink ejection amount is large comprises the following three types of dots or areas.

Two standard size cyan areas (dots) 10623.

Two blue areas 10624 comprising standard size cyan dots that are formed in the middle of magenta dots that are larger than standard size.

Two magenta areas 10625 that are formed around standard size blue areas 10624.

Here, in conventional head shading as described above, the number of the respective dots is adjusted by individually correcting the cyan and magenta image data. As a result, the surface area of two cyan areas (dots) 10623=the surface area of two blue areas 10624=the surface area of two magenta areas 10625. In this case, when the color that is observed as a whole according to the light absorption characteristic of the cyan area 10623 and the light absorption characteristic of the magenta area 10625 is the same as the color that is observed according to the light absorption characteristic of the blue area 10624, the color of this overall area becomes the same color as the blue area 10624.

However, when an area is formed by overlapping a plurality of different color inks as in the blue area 10624, the color that is observed according to the light absorption characteristic of that area is often different from the overall color that is observed by combining the light absorption characteristics of the areas of the plurality of inks. As a result, in that overall area, shifting of color from the desired standard color occurs, and as a result, on the printing paper 106, the color of the blue image in the half of the area on the left side of the figure appears to be a different color than the blue image in the half of the area on the right side.

For example, even when using a four-value printing apparatus that performs printing using three grades of dots, large, medium and small, or a multi-value printing apparatus in which the dot size can be changed, variation in the size of the dots may occur due to variation in the ejection amounts among nozzles. In this case as well, uneven color due to the same reason described above may occur even though correction is performed using conventional head shading. Therefore, application of the present invention is not limited to a two-value printing apparatus, but can also be applied to a three-value or greater multi-value printing apparatus.

The embodiments of the present invention reduce uneven color in a printed image by performing a correction process on color signals that specify the values of the pixels of image data before quantization.

(Embodiment 1)

FIG. 4A is a block diagram illustrating the construction of in image processing unit in an inkjet printing apparatus of a first embodiment of the present invention. In other words, this embodiment comprises an image processing unit having elements for performing control and processing of the printer 100 illustrated in FIG. 2. Of course application of the present invention is not limited to this form. For example, the image processing unit can be constructed using the PC 300, or part of the image processing unit can be constructed using the PC 300, and the other part can be constructed using the printer 100.

As illustrated in FIG. 4A, an input unit 401 inputs image data that was transmitted from a host PC 300 to an image processing unit 402. This image processing unit 402 comprises an input color conversion processing unit 403, a MCS (Multi Color Shading) processing unit 404, ink color conversion processing unit 405, HS (Head Shading) processing unit 406, TRC (Tone Reproduction Curve) processing unit 407 and a quantization processing unit 408.

In the image processing unit 902, first, the input color conversion processing unit 403 converts the input data from the input unit 401 to image data that corresponds to the color reproduction area of the printer. The input image data is data that indicates the color coordinates (R, G, B) in color spatial coordinates such as sRGB, which are the colors expressed on a monitor. The input color conversion processing unit 403 converts inputted 8-bit input image data R, G, B to image data of the color reproduction area of the printer (R', G' B'), which is a color signal that comprises three components, using a known method such as matrix computation processing or processing using a three-dimensional lookup table. In this embodiment, conversion processing is performed by using a three-dimensional lookup table in combination with interpolation processing. The resolution of the 8-bit image data that is handled by the image processing unit 402 is 600 dpi, and the resolution of the binary data that is obtained from quantization by the quantization processing unit 408 that will be described later is 1200 dpi.

The MCS processing unit 404 performs color correction processing of the image data that was converted by the input color conversion processing unit 403. This process, as will be described later, is also performed using a correction table (conversion table) comprising a three-dimensional lookup table (LUT). The three-dimensional LUT has a plurality of table parameters that are assigned to each of a nozzle or a specified number of nozzles in a plurality of nozzle arrays that eject a plurality of inks and that are used in printing in the same area on a printing medium. Color correction processing is performed on the RGB signal, which is a color signal for the pixels of the image data, using table parameters from among the plurality of table parameters that are assigned to nozzles corresponding to the RGB signal. By performing this correction process, even when there is variation in the ejection characteristics among nozzles of the printing head of the output unit 409, it is possible to reduce the uneven color described above caused by that variation. A detailed description of the table and the correction processing by the MCS processing unit 404 will be given later. In this embodiment, the MCS processing unit 404 is constructed such that RGB signal values are inputted and RGB signal values as a result of correction by a three-dimensional LUT are outputted, and performs processing as explained below. However, when the input signal values input to the ink color conversion processing unit 405 explained next are taken to be CMYK, the MCS processing unit 404 can also be constructed such that RGB signal values are input and CMYK values are output. In that case, the MCS processing unit 404 stores a three-dimensional. LUT that converts RGB signal values to CMYK signal values. Moreover, when the input color conversion processing unit 403 can output CMYK signal values, the MCS processing unit 404 can store a four-dimensional. LUT for the CMYK signal values, and can be constructed such that CMYK signal values are inputted and CMYK signal values are outputted.

The ink color conversion processing unit 405 converts image data comprising the 8-bit R, G and B signals that are processed by the MCS processing unit 404 to image data comprising color signal data that will be used by the printer. The printer 100 of this embodiment uses black (K), cyan (C), magenta (M) and yellow (Y) ink, so that the image data of the RGB signal is converted to image data comprising 8-bit color signals for K, C, M and Y. This conversion as well, similar to that by the input color conversion processing unit 403 described above is performed using a three-dimension LUT in combination with interpolation processing. It is also possible to use a matrix computation processing method as mentioned above as another conversion method.

The HS processing unit 406 is inputted with image data of the ink color signals, and for each ink color converts the respective 8-bit data to image data of the ink color signals that correspond to the ejection amounts of the nozzles of the printing head. In other words, the HS processing unit 406 performs the same processing as the conventional head shading process. In this embodiment, this HS process is performed using a one-dimensional LUT.

The TRC processing unit 407 performs correction of the image data comprising the HS processed 8-bit ink color signal in order to adjust the number of dots of each ink color printed by the output unit 409. Typically, there is no linear relationship between the number of dots printed on the printing medium and the optical density achieved on the printing medium by that number of dots. Therefore, the TRC processing unit 407 corrects the 8-bit image data and adjusts the number of dots printed on the printing medium in order to obtain a linear relationship.

The quantization processing unit 408 performs quantization of the 8-bit 256-value ink color image data that was processed by the TRC processing unit 407, in order to obtain 1-bit binary data. When doing this, in this embodiment, first, the data is converted to 3-bit 5-value index data '0' to '4' for each ink color. This index data '0' to '4' corresponds to a 2-pixel×2-pixel pattern in which 0 to 4 dots are arranged having a resolution of 1200 dpi. Of course, in applying the present invention, the form of the quantization processing unit 408 is not limited to this example. For example, a form is possible in which 8-bit image data is binarized to directly obtain binary data (dot data). Moreover, in this embodiment, the error-diffusion method is used as the quantization method, however; it is also possible to use other pseudo halftone processing such as the dithering method.

The output unit 409 performs printing by driving the printing head ejecting ink of the different colors onto the printing medium based on the dot data obtained through quantization. More specifically, the output unit 409 has a printing mechanism that comprises the printing heads 101 to 104.

Figure 5:
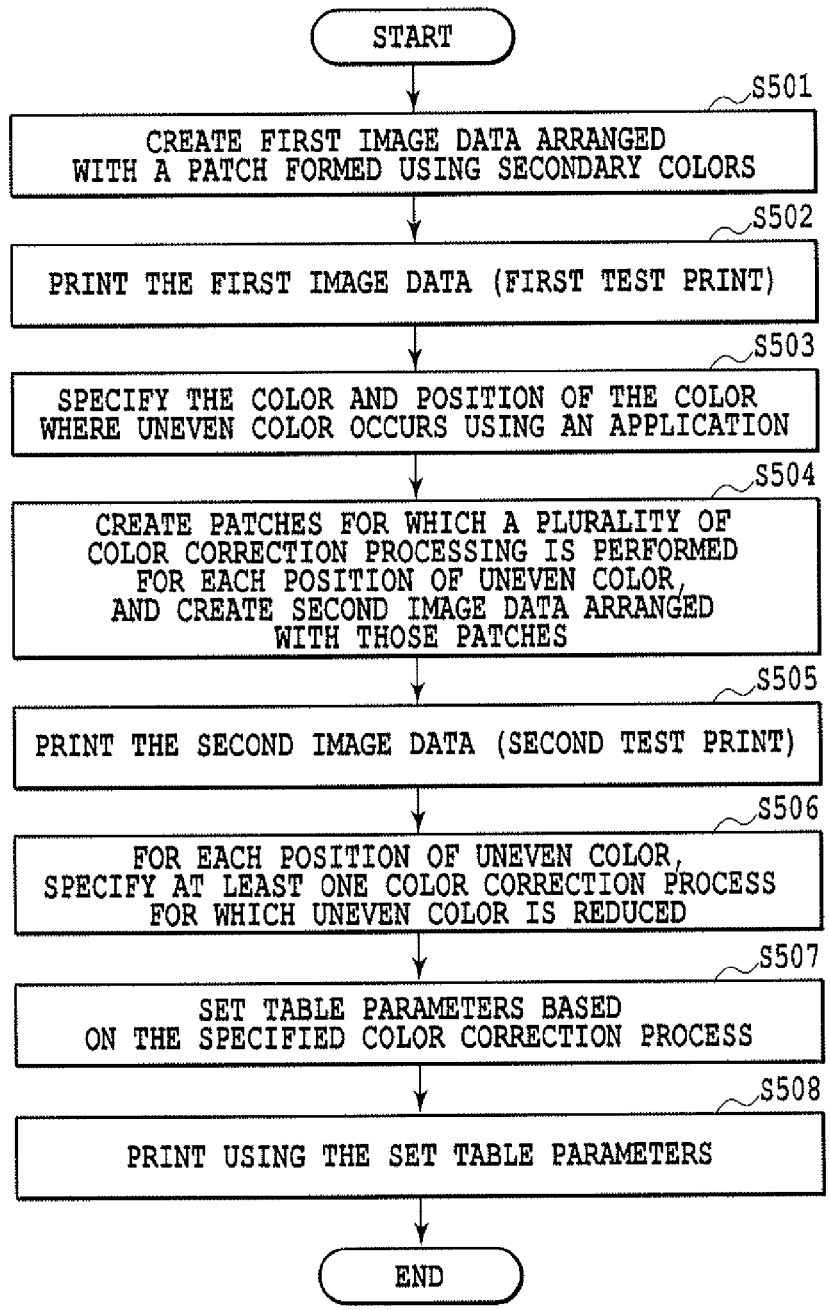
FIG. 5 is a flowchart illustrating processing that generates parameters of a table used in the MCS processing section illustrated in FIG. 4A, and processing using the above table by the MCS processing section in image processing upon generation of printing data.

FIG. 5 is a flowchart illustrating a process of generating table parameters to be used by the MCS processing unit 909, and the processing by the MCS processing unit 404 that uses that table in image processing when generating printing data.

In FIG. 5, steps S501 to S507 are a process that generates parameters of the three-dimensional lookup table that is used by the MCS processing unit 409. More specifically, step S501 is a process of generating image data that is inputted to the input unit 401. Step S502 is a process of the printer performing printing by way of the input color conversion processing unit 403 to output unit 409. Step S503 is a process of using a keyboard or mouse of the host PC 300 to specify the area where uneven color occurs. Step S509 is a process of generating image data that is inputted to the input unit 401 based on the area specified in step S503. Step S505 is a process of the printer performing printing as in step S502. Step S506 is a process of using the keyboard or mouse of the host PC 300 to specify image processing. Step S507 is a step of generating parameters for the three-dimensional LUT that is used by the MCS processing unit 404. In this embodiment, this kind of parameter generation process is forcibly or selectively executed when the printer is manufactured, when the printer is used for a specified period of time, or when performing a specified amount of printing. Moreover, each time that printing is performed, for example, this process can be executed before that operation. In other words, that process can be performed as so-called calibration, and through this process, the table parameters of the LUT are updated.

Step S508 is a process executed by the image process accelerator 316 as a part of the image processing by the image processing unit 402 as shown in FIG. 4A. The part of the image processing is for generating printing data when printing using the printer.

In this embodiment, the table parameters for the MCS processing unit 404 are created on the premise that table parameters for the HS processing unit are created. Therefore, when step S501 of this process is started, table parameters for the HS processing unit 406 have already been created (updated) by a known method. In the generation of table parameters for the HS processing unit 406, variation in density that appears on the printing medium is suppressed for each ink color. Consequently, parameters are created, for example, so that for nozzles having a comparatively large ejection amount, the number of ejections is suppressed, and for nozzles having a comparatively small ejection amount, the number of ejections is increased. Therefore, for the nozzles 10321 of the magenta head 103 illustrated in FIG. 3A for example, parameters are created so that the number of dots are kept to approximately half, as illustrated in FIG. 3B. Moreover, for the cyan head 102, parameters are created so that the number of dots is not changed as illustrated in FIG. 3B. As described above, in this embodiment, when creating or updating table parameters for the MCS processing unit 404, the table parameters for the HS processing unit 406 are completed before that. By doing so, when creating the parameters for the MCS processing unit 404, it is possible to suitably reduce uneven color due to variation of the ejection characteristics among nozzles by both the processing by the MCS processing unit 404 and HS processing unit 406.

In this embodiment, as described above, the MSC processing unit 404 was explained as a system to which RGB signal values are inputted and RGB signal values are outputted. On the other hand, as will be explained later, in the process of finding table parameters, there is a process of handling colors to be printed on the printing medium. When performing that process, it is preferred that there be parameters, such as an LUT that converts RGB signal values to L*a*b* values or CMYK values, that can reproduce colors on the printing medium when ejecting a standard amount of ink. It is also possible to provide a conversion method of converting RGB signal values to L*a*b* values on the printing medium. By doing so, in this embodiment, it is possible to estimate conversion values for the input values for expressing desired colors on the printing medium. Particularly, in the processing of step S504 described later, it is possible to perform a color conversion process based on colors on the printing medium. In order for this, preferably the MCS processing unit 404 is given a printer profile for each printing medium and an LUT that is used by the ink color conversion processing unit 405 before performing the processing illustrated in FIG. 5.

Therefore, before the performing the processing illustrated in FIG. 5, the printing medium that is used when generating table parameters for the MCS process is specified from the host PC 300. In addition, in accordance with that specification, a printer profile for each printing medium and an LUT that is used by the ink color conversion processing unit 405 are copied from the ROM 313 of the printer 100 to the RAM 302 of the host PC 300. Specifying the printing medium, can be performed manually by the user selecting the printing medium from a list of pre-prepared printing mediums, or the printing medium can be automatically detected by the printer 100, and that result transferred to the host PC 300.

In step S501, the host PC 300 creates an image having a color image (patch) for measuring a plurality of colors including secondary colors. When doing this, creating a 16,770,000-color patch with 256 gradations, for example, requires an enormous cost. In order to accomplish this, the signal values 0 to 255 for R, G and B can be divided into 17 equal parts, and a patch for all combinations (grid points) 17×17×17 can be printed. The user can also select a hue for which uneven color is a concern, and create a patch that is included in that hue using a layout method. In other words, in order to reduced the memory used and the work time, of the aforementioned grid points, the grid points for which uneven color particularly changed greatly due to the ejection characteristics are selected, and a patch is printed for just the R, G and B group corresponding to these grid points. Moreover, it is possible for (R, G, B)=(0, 0, 255) corresponding to the blue image explained in FIGS. 3A to 3C to be included for one of these grid points. In the selection of the color (grid point) for printing the measurement color image, the R, G, B group for which uneven color due to the ejection amount becomes greater than a specified amount can be set, and the types (groups of color signals) and number of patches can be set according to the computation load and memory space. In addition, instead of RGB grid points, it is also possible to use a printer profile and LUT that is used by the ink color conversion processing unit 405 to create an image in which the patches are uniformly spaced inside a uniform color space.

On the other hand, an identifier from which nozzle position information is known is correlated with a patch and added near the patch. A know method can be used to add a number or scale, for example, as the identifier. An image that is created in this way is taken to be first image data.

Figure 6:
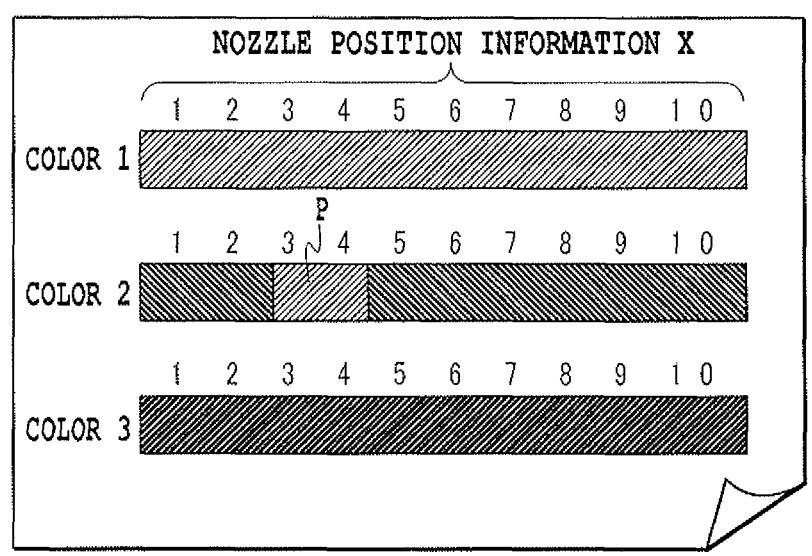
FIG. 6 is a diagram illustrating layouts of test color images.
Figure 10A:
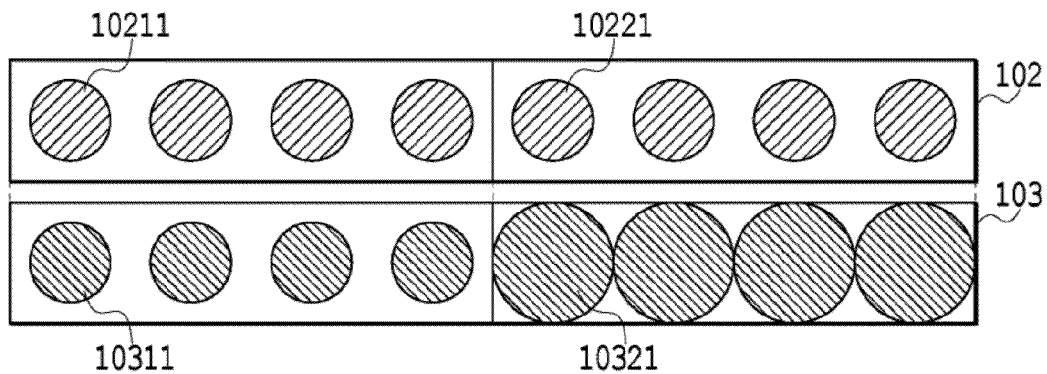
FIGS. 10A and 10B are diagrams for describing printing states of test color images.
Figure 10B:
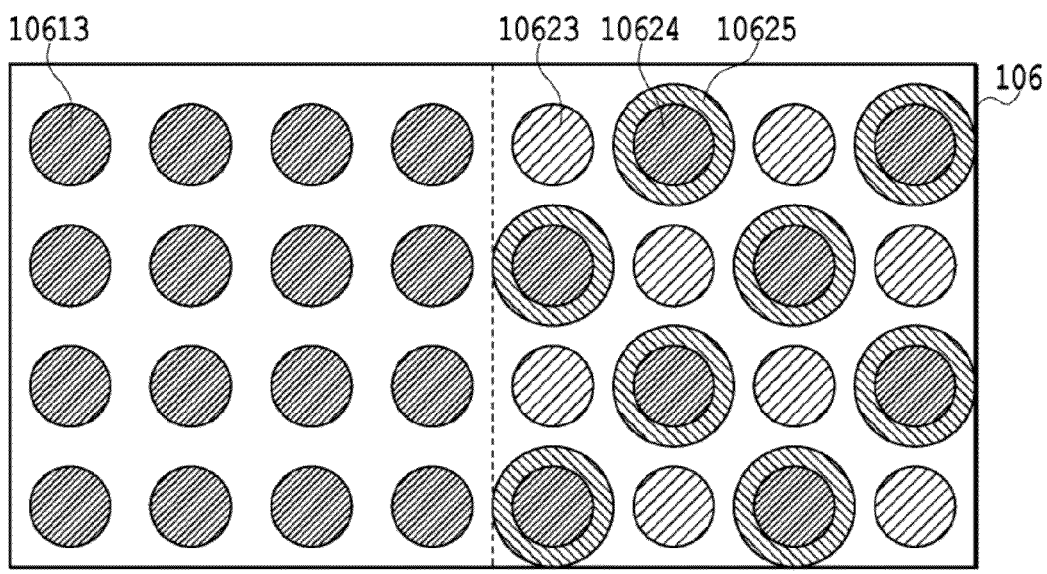

In step S502, the first image data created in step S501 is printed (first output means). This is called the first test print. An example of the layout of this first test print is illustrated in FIG. 6. After the printing process has started, ink is ejected from all of the nozzles of the printing heads illustrated in FIG. 1, and a patch is printed on the printing medium. The image data (R, G, B) of the selected group is input to the ink color conversion processing unit 405 as image data that has undergone processing by the input color conversion processing unit 403 (hereafter, referred to as device color image data D[X]) without going through processing by the MCS processing unit 404. This kind of path is illustrated by the dashed line 410 in FIG. 4A as a bypass path. For the processing by this bypass path, a process can be performed of preparing a table in which an input value=output value, for example, and the device color image data NM is input to the MCS processing unit 404, however, is output as is as the input value regardless of X. After that, the HS processing unit 406, TRC processing unit 407 and quantization processing unit 408 perform the same processing as for normal data, and the output unit 409 prints a Lest color image on the printing paper 106. In this process, the image data of the test color image that is expressed using (R, G, B) is converted by the ink color conversion processing unit 405 to image data (C, M, Y, K) according to the ink color signal. When doing this, when (R, C, B)=(0, 0, 255) is included in one of the image data of the test color image, that signal value is (K, C, M, Y)=(0, 255, 255, 0), or in other words, the data is converted to data for which cyan and magenta are printed at 100% each. After that, from processing by the HS processing unit 406 and later processing, the image data for which (K, C, N, Y)=(0, 255, 255, 0) is printed as dot data as illustrated in FIG. 3B. In the following explanation, in order to simplify the explanation, only the process of creating table parameters that correspond to the grid points of the image data for this blue test color image will be explained. Here, X is information indicating the nozzle position for each group of four nozzles of each color in the x direction of the printing heads 101 to 104 illustrated in FIG. 1. In the MCS process of this embodiment, processing is performed in this way in nozzle units comprising a specified number (four) of nozzles, and image data is corrected in nozzle units. Moreover, device color image data D[X] is image data that is to be printed by four nozzles that are arranged in an area X for each ink color. FIG. 10A and FIG. 10B are drawings for explaining the printed state of a test color image in step S502. In FIG. 10A and FIG. 10B, the same reference numbers are used for elements that are the same as the elements illustrated in FIG. 3A to FIG. 3C, and an explanation of those elements is omitted.

FIG. 10A is similar to FIG. 3A and illustrates the case in which of the magenta printing nozzles 103, the ejection amount of the four nozzles corresponding to the second area is greater than the standard amount. Therefore, by performing HS processing on the image data (K, C, M, Y)=(0, 255, 255, 0) that expresses blue, a test color image for blue is printed as illustrated in FIG. 10B. In other words, uneven color occurs in the second area that includes the nozzles having an ejection amount that is greater than the standard amount, and a color forming patch that is different from the standard blue of the first area is printed.

By observing this printed state, the user is able to identify from the first test printing for which color and at which nozzle positions uneven color occurs. For example, in FIG. 6, the user can identify that uneven color has occurred for 'color 2' at 'nozzle positions 3 and 4'.

However, in the case that table parameters are created for the MCS processing unit 404 before this process, the image data passes through processing by the MCS processing unit 404 and inputted to the ink color conversion processing unit 405. Here, the table parameters that are used by the MCS processing unit 404 are table parameters that were updated before this process when uneven color was discovered. In this case, the dashed line 410 in FIG. 4A described above was used as a bypass path; however, it is also possible to go through the MCS processing unit 404.

Next, in step S503, the color and nozzle position (area of occurrence) in the first test print that was identified by the user as having uneven color is specified using an application. In other words, a patch where uneven color, occurred and the area where uneven color occurred in that patch (color correction area for which color correction processing is to be performed) are specified. The host PC 300 has each patch displayed on a display 306 as a display means. The patch where uneven color occurred and the area of occurrence can be specified, for example, by using an input device such as a mouse or keyboard. As a first reception means, the host PC 300 receives information related to this specification operation and identifies the patch for which color correction is to be performed and the color correction area thereof.

Figure 7:
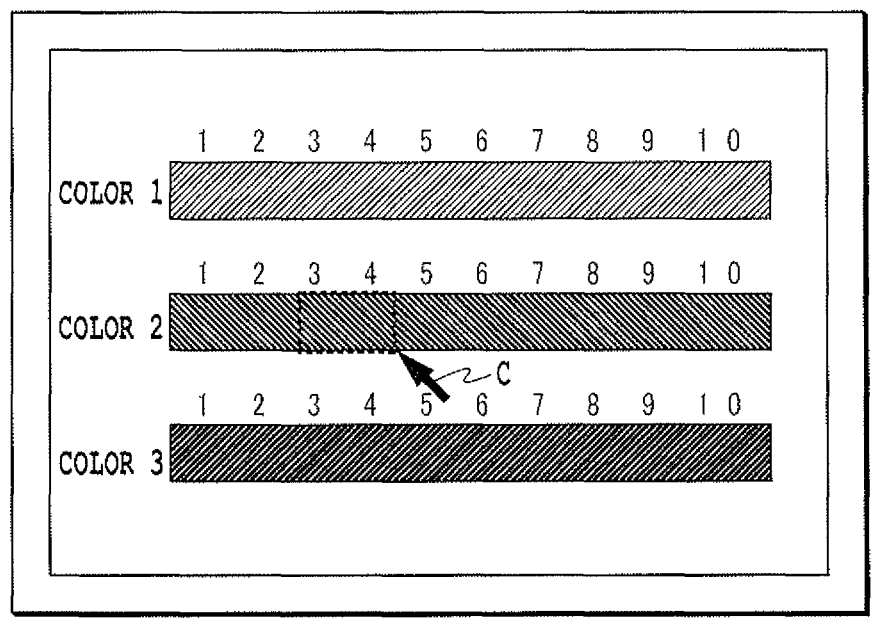
FIG. 7 is a diagram illustrating a user interface for specifying an occurrence region of color unevenness in the test color images.

FIG. 7 illustrates the user interface for the interface that performs this processing. In the first test print illustrated in FIG. 6, when the area of occurrence of uneven color P is detected at 'nozzle positions 3 and 4' for 'color 2', the area of that uneven color is specified in FIG. 7. The method of specification can be a method of using a cursor C to specify both end positions of the area of occurrence of uneven color (nozzle position 3 and 4) in the 'color 2' path illustrated in FIG. 7, for example. In addition, when there is a density gradient within the area of occurrence of uneven color (within the color correction area), a method of selecting the location of the maximum amount of uneven color, or in other words, the position where the intensity of uneven color is a maximum (characteristic point) on the patch in FIG. 7 can be provided. As processing in this case, the color correction processing that is performed in step S504 can be performed at a larger amount the closer the nozzle position is to the maximum value position, and performed at a lesser amount the closer the nozzle position is to the end positions of the uneven color. By doing so, even when there is a density gradient in the uneven color, it is possible to change the color correction processing according to the nozzle position. On the other hand, when specifying the color and nozzle position of the uneven color, instead of the method of using a cursor as in FIG. 7, a method can be used in which a number is given to the colors and nozzle positions, and the color and nozzle position of the uneven color are specified using those numbers.

Figure 8:
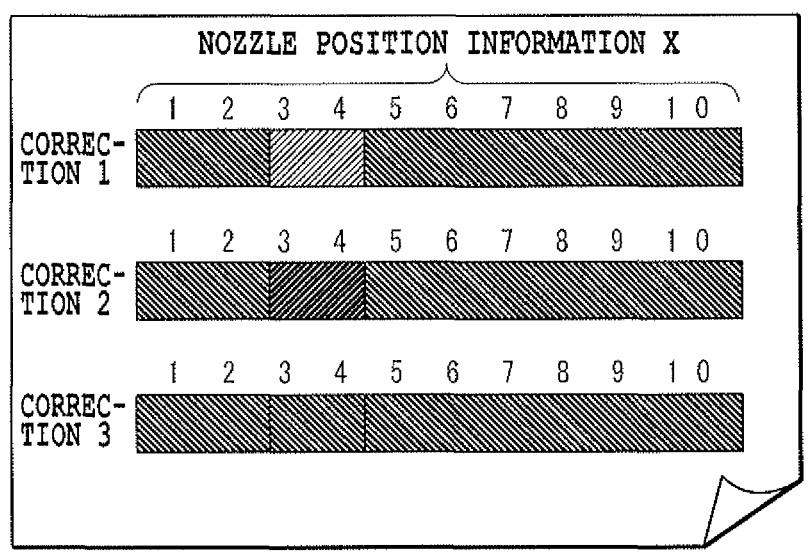
FIG. 8 is a diagram illustrating layouts of candidate color correction images.

Next, in step S504, color correction processing is performed on the color and nozzle position specified in step S503. Color correction image (color correction patches) comprising only the color specified in step S503 are created by performing a plurality of different color correction processes for the specified nozzle position, and image data that is laid out with these color correction patches is created. An identifier from which the nozzle position information is known is correlated with the patch near the patch. This is taken to be second image data. Here, the plurality of different color correction processes can create a plurality of points separated an arbitrary distance within the color space from the first test print color. FIG. 8 illustrates this image data when printed.

In explaining this step S504 in more detail, the test color image of blue at the grid point where the device color image data D[X] is (R, G, B)=(0, 0, 255) is printed by the cyan and magenta printing heads 102 and 103 illustrated in FIG. 1. Hereafter, the nth area will be where X=n). In step S503, for the color (in other words grid point) that was specified as a color of which there is a tendency for uneven color to greatly change, table parameters are found for each position that corresponds to the specified nozzle (in other words area [X]). Moreover, table parameters for grid points other than the specified grid points are found by interpolation between specified grid points. A known method can be used for the method of interpolation, so that an explanation of the method is omitted. Here, each area [X] corresponds to an area of four nozzles having a resolution of 1200 dpi, however, the resolution of the pixels in image processing is 600 dpi, so two pixels in the x direction correspond to each area X.

The X value of the area [X] specified in S503 is taken to be n. The table corresponding to this area [n] is created by adding m number of color correction values $Zi[n]$, for which the values have changed in the RGB direction from the image data (R, G, B) of that grid point, to the respective device color image data D[n]. Here, the added letter is the color correction number when a plurality of different color correction processes is performed. For example, when R, G, B of 'color 2' specified in FIG. 7 is blue (0, 0, 255), the first the color correction values $Z1[n]$ of blue that corresponds to the area [n] is taken to be (10, 0, 0) as described above. Next, the second color correction value $Z2[n]$ is taken to be (0, 10, 0). Furthermore, the third color correction $Z3[n]$ is taken to be (0, 0, 10). Moreover, color correction values $Zi[n]$ are added to the specified grid point RGB according to the equation below to obtain color corrected device color image data $Di[X]$ (second color signal). In other words, the relationship between the first color signal D[X] and second color signal $Di[X]$ is as given below.

Color corrected device color, image data $Di[n]=D[n]+Zi[n]$

In the case of this example, color correction processing is not performed for the unspecified first area as the uneven color. Therefore, D[1] does not change. That is, in MCS processing, color correction processing is not performed. On the other hand, for the nth area that is specified as uneven color $Zi[n] \neq 0$, so in MCS processing, different color correction is performed for Di[n] than for D[n].

The m number of patches created in this way are laid out in parallel in an image in order to create image data. In the example described above, color correction was performed based on RGB values, however, it is possible to convert to uniform color space (L*, a*, b*) and create m number of color corrected patches so that they are uniformly spaced. In other words, using the printer profile and LUT that is used by the ink color conversion processing unit 405 described above, processing is performed by converting the first color signal D[X], second color signal Di[X] or color correction values Zi[n] to L*a*b* values or CMYK values. The process first converts the RGB values of the first color signal D[X] to L*a*b* values according to the printer profile. Next, the color correction values Zi[n] that are expressed in L*a*b* values are added to obtain a second color signal Di[X]. Finally, by performing interpolation by the inverse operation using the printer profile, it is possible to perform color correction based on L*a*b* values.

It is also possible to change the size of the color correction values Zi[n] according the position in color space. For example, it is possible for the human eye to recognize differences in colors near gray with good precision, so the size of the color correction values Zi[n] is decreased. By doing so, it is possible to perform finite color correction processing. However, compared to near gray color, it is not possible for the human eye to recognize uneven color in areas having low brightness or high hue, so that the size of the color correction values Zi[n] can be increased.

Furthermore, the size of the color correction values Zi[n] can be changed according to the nozzle position of the printer. Uneven color may differ according to the position of the heads in the printer. For example, in the case of a head having a plurality of tips, uneven color may occur at the positions of the connections between tips. In that case, by making the size of the color correction values Zi[n] at the positions of the connections between tips larger than normal, it is possible to handle intense uneven color.

It is possible to arrange patches for which color correction has not been performed using the first test print among a plurality of different color correction patches. By doing so, the user can check the result by comparing the color corrected patches with the patch for which color correction has not been performed. Moreover, in step S506, at least one patch is selected from among a plurality of patches; however, depending on the intensity of the uneven color and the size of the color correction values Zi[n], a patch that has not undergone color correction may be a patch with the least noticeable uneven color. As the selection in that case, by laying out patches that have not undergone color correction processing, it is possible to perform selection that will keep error to a minimum. Furthermore, this is effective in eliminating differences in test prints. For example, it is also possible to compare a plurality of patches for which color correction has been performed using a patch from the first test print that has not undergone color correction processing as described above; however, when the test print and printing paper are different, difference in patch color may occur. A method of simultaneously printing patches for which color correction has not been performed is effective as a method for solving that problem.

In step S505, the second image data that was created in step S504 is printed on the printing medium (second output means). This is called the second test print. This second test print is illustrated in FIG. 8, where it is confirmed that the color of the uneven color at the position specified by the user in step S503 is changing by a plurality of color correction processing.

Figure 9:
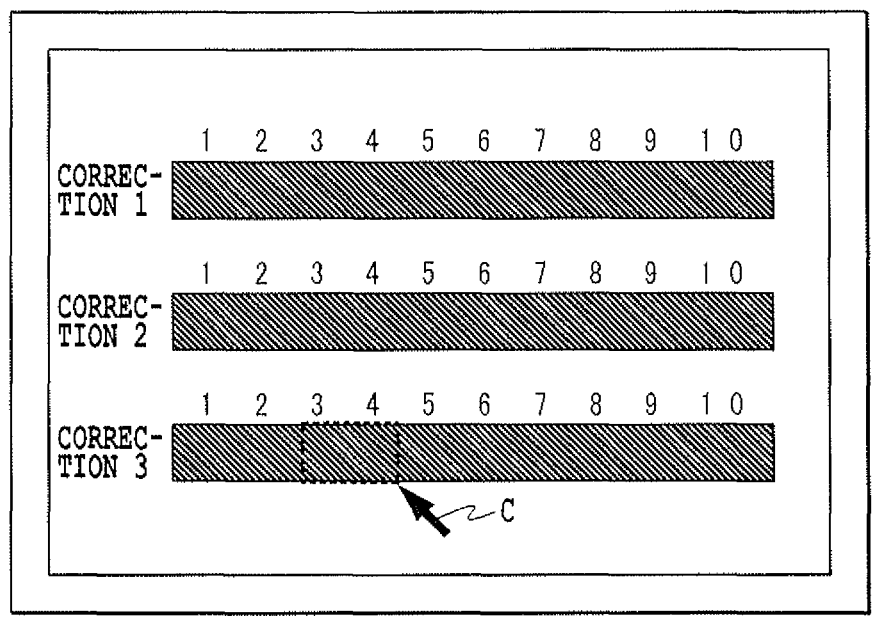
FIG. 9 is a diagram illustrating a user interface for selecting a color correction image to be used from a plurality of candidate color correction images.

In step S506, the user visually determines which of the patches from among the plurality of patches in the second test print have undergone the most reduction of uneven color, and specifies the color correction number of at least one of those patches. The user interface of the application for performing this is illustrated in FIG. 9. The host PC 300 has the color correction patches displayed on the display 306. For example, when the color correction can reduce uneven color the most from among the m number of color correction patches, 'correction i' is specified for the nozzle position specified in FIG. 7. In FIG. 8, uneven color is reduced in 'correction 3', so 'nozzle position 3 to 4' for 'correction 3' can be selected with the cursor in FIG. 9. Instead of the cursor in FIG. 9, numbers can be assigned to color correction and position as in step S503, and the respective number can be specified. In addition, when there are two patches for which the reduction in uneven color is about the same, those two can be specified. The host PC 300, as a second reception means, receives information about the selected color correction processing and recognizes this.

On the other hand, when it is not possible to reduce uneven color with a color correction patch, at least one patch having the most effect is selected from among the color correction patches. In addition, the second test print is performed again based on that patch. In other words, returning to step S504, the second image data is created again. This is taken to be the third image data, and this print is called the third test print.

The uneven color of the color correction patch that was selected at this time is at least reduced more than other color correction patches. In other words, for the other color correction patches that were not selected, the size of the color correction values Zi[n] was too large. Therefore, when creating third image data, the size of the color corrections values Zi[n] should be made to be less than those of the second image data. For example, the size is made to be half the size of the color correction values Zi[n] that were created for the second image data. In other words, this process is made to converge, making it possible to narrow down the number of color correction patches for which the uneven color can be reduced.

Moreover, when the uneven color cannot be reduced even in the third test print, the process flow described above can be repeated and a fourth test print or later can be performed.

Incidentally, in the second test print described above, the size of the color correction values Zi[n] is large, so that the processing flow of the case when it is not possible to reduce uneven color is given. However, the intensity of the uneven color that occurred is large, therefore there are cases in which the size of the color correction values Zi[n] of the second test print is small and uneven color cannot be corrected. In that case, the size of color correction values Zi[n] of the third test print must be made to be large instead. When doing that, the size of the color correction values Zi[n] can be specified using the user interface when performing the third test print. By creating the image of the third test print based on this value, it is possible to make a color correction patch that can effectively reduce the uneven color.

In step S507, of the plurality of table parameters of the conversion table used by the MCS processing unit 404, those that correspond to the nozzle position X are changed based on the color correction processing selected in step S506. By doing so, it is possible to create table parameters that can reduce uneven color according to the ink ejection characteristics of the nozzles. When a plurality of color correction patches is specified in the second test print in step S506, a color correction process can be performed that takes, for example, the average of those patches. More specifically, of the plurality of specified color correction patches, the first color correction patch is taken to be a process of correcting the color of the RGB values by just (0, 0, 10), and the second color correction patch is taken to be a process of correcting the color of the RGB values by just (0, 10, 0). In that case, the color correction process that is finally set is a process that averages the RGB values (0, 5, 5), or a process that takes these two vectors (0, 10, 10). In order to accurately reduce uneven color using a finite color correction patch as illustrated in FIG. 8, performing an additive method that simultaneously specifies a plurality of color correction patches in this way is effective. The newly created table parameters are set in the MCS processing unit 404. The table parameters of each grid point are correlated to the nozzle positions and stored in memory. Here, in this embodiment, the memory used for storing the parameters is the HDD 303 of the host PC; however, the memory could also be a nonvolatile memory that is prepared in the printer. In either case, it is preferred that the created parameters be handled so that they are not lost when the power supply is turned OFF.

In step S508, arbitrary image data is printed using the MCS processing unit 404 in which the new table parameters are set. This process, during normal printing operation, is a process that is performed by the image processing accelerator 316 according to the series of image processing illustrated in FIG. 4A.

First, the image processing accelerator 316 uses the newly created table parameters on the device color image data D[X] (first color signal), and performs a color correction process. Next, the image processing accelerator 316 performs processing by way of the ink color conversion processing unit 405, HS processing unit 406, TRC processing unit 907 and quantization processing unit 400 on the obtained device color image data Di[X] (second color signal). Then, according to the obtained binary data, prints ink dots on the printing paper 106 by way of the output unit 409.

Figure 11A:
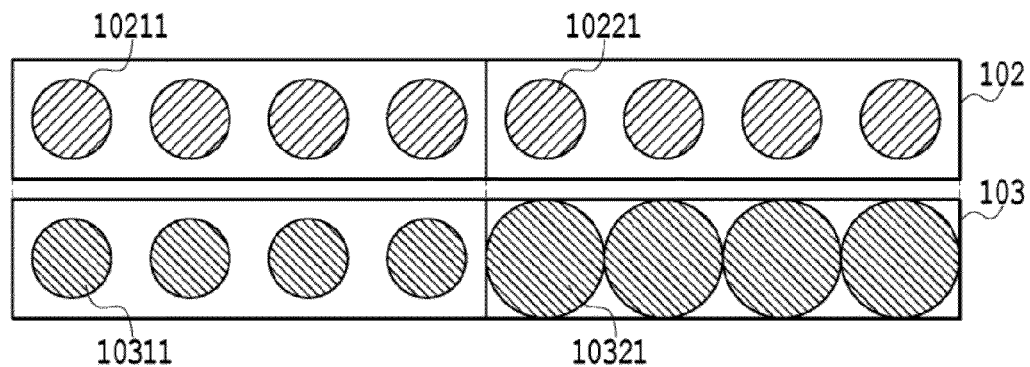
FIGS. 11A and 11B are diagrams for describing an example of images after the processing by the MCS processing section in FIG. 9A.
Figure 11B:
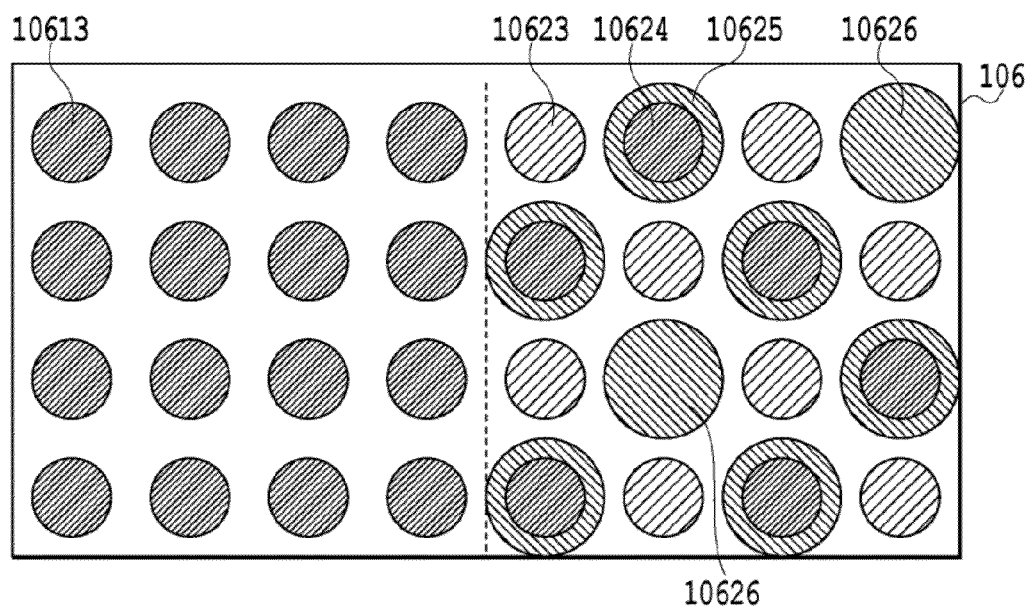

FIGS. 11A and 11B are drawings explaining an example of an image that was printed in step S508 in FIG. 5. FIG. 11A is similar to FIG. 10A and illustrates the ejection amount characteristics of the cyan and magenta printing heads 102, 103. On the other hand, FIG. 11B is a drawing for comparing and explaining the printed state of dots obtained as a result of performing the MOS processing of this embodiment, and the printed state obtained as a result of performing just the HS processing illustrated in FIG. 10B. In the state illustrated in FIG. 10B where only HS processing is performed, in the nth area where it is determined that the cyan color tone is intense, MCS processing is performed so that Di[n] is generated such that the cyan tone is reduced more than that of D[n]. As a result, the number of cyan dots 10623 is reduced more than the printed state illustrated in FIG. 10B resulting from performing only HS processing. A certain amount of uneven color occurred due to variation in the ejection amount; however, the color is close to the color in which there is no uneven color.

As explained above, in this embodiment, test color images (patches) are printed on a printing medium for colors (R, G, B) that tend to have a large change in uneven color, a user specifies the color and nozzle position where uneven color occurs through visual check, and table parameters are found based on that result. Generally, the tendency of uneven color depends on both (1) the printed color itself, and (2) the printing characteristics of the colors of ink printed on the printing medium. In the case of (1) above, even when there is similar variation in the ejection amount, uneven color is more noticeable in blue than red. In the case of (2), in addition to the ejection amount, the ejection direction, dot shape, permeation rate, type of printing medium and the like, these characteristics are elements that affect the uneven color such as the size and density of dots and ink colors of overlapping dots.

It is clear that the amount of uneven color depends on a combination of printing characteristics of the ink color used when printing that color, and depends on the printing characteristics of the ink colors not used. In other words, the type and number of relevant ink colors differ for each pixel, and depending on the pixel, the case is possible in which there is only one relevant ink color, and uneven color does not occur.

Above, an example of the case in which the ejection amount of all of the four magenta nozzles that are included in the same area is greater than the standard amount was explained; however, it is possible that the ejection characteristics of each of the nozzles in one area will vary. In such a case as well, by acquiring the average amount of uneven color in the same area and perform processing such as to correct that uneven color by all of the four nozzles, it is possible to obtain the effect described above.

For data that can be expressed by a single color of the ink colors used by the printing apparatus, density is already adjusted by HS processing, so that uneven color does not occur. Therefore, for that color there is no need for processing by the MCS processing unit 404. An example of such a state will be explained in detail below using an example of a case in which the measured color space completely matches the device color space.

When the measured color space completely matches the device color space, the color signal (R, G, B)=(0, 255, 255) is converted by the ink color conversion processing unit to (C, M, Y, K)=(255, 0, 0). For just cyan color (C signal), suitable density adjustment has already been performed by the primary conversion of the HS process, so the cyan data should not be changed any more than already adjusted by the HS process and other color data should not be added. In other words, in the case of having this kind of data, the correction value for the specified area of uneven color should be (0, 0, 0). The same is done for 100% magenta data (R, G, B)=(255, 0, 255) as well. On the other hand, for 100% blue (R, G, B)=(0, 0, 255), the data cannot be expressed by a single color of ink that is used by the printing apparatus, and is expressed by a combination of cyan ink and magenta ink. Therefore, as was already explained using FIGS. 3A to 3C, there is a possibility that uneven color will occur even though HS processing was performed. Therefore, in the example illustrated in FIG. 10B, $$Zi[n] \neq (0,0,0)$$

and suitable correction is performed by MCS processing.

Figure 12:
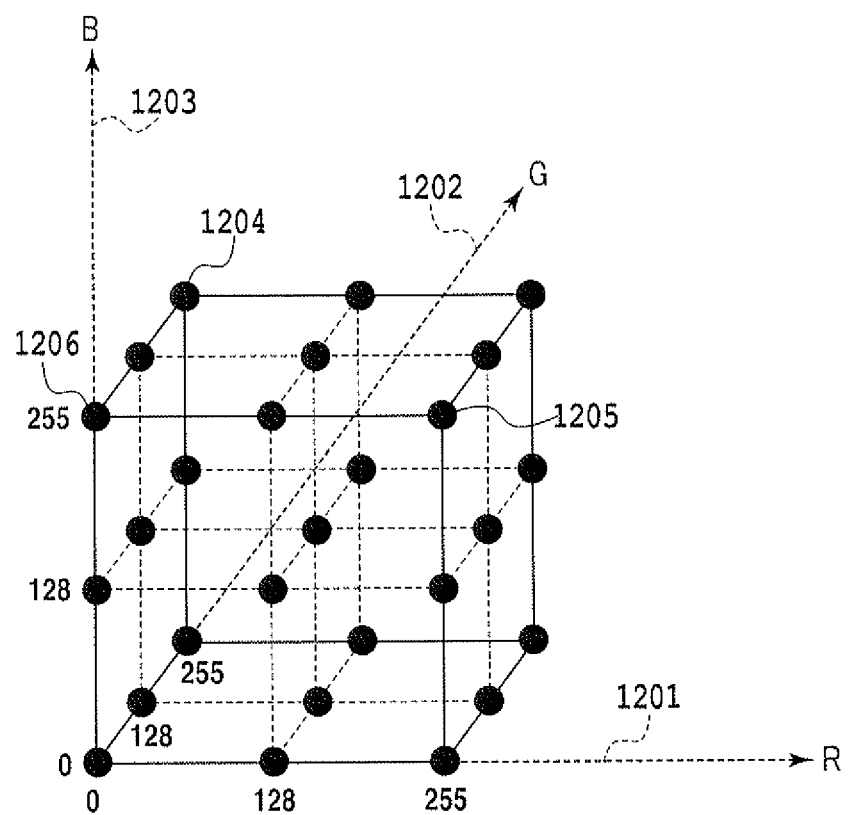
FIG. 12 is a diagram illustrating lattice points of which coordinates are determined at regular intervals in an RGB space.

In this way, in three-dimensional RGB space, there are grid points that require MCS processing and grid points that do not require MCS processing, so that the amount of correction varies according to the signal value (position of the grid point). Therefore, when it is desired to suppress uneven color in the entire color space, it is preferable that correction signal values for the MCS process be prepared for all of the RGB values. However, printing patches and measuring the color for all RGB combinations, calculating the correction values, and preparing the area for printing the obtained correction values causes an increase in processing load, and as well as an increase in necessary memory capacity and processing time. Therefore, as in this embodiment, it is preferable that several colors be selected in RGB space for which correction of uneven color is particularly necessary, test color images (patches) be printed using signal values that correspond to those colors, respective equivalent correction values be obtained and a table be created. However, in a case where the color is not particularly limited to a color having a large tendency for uneven color, for example, as illustrated in FIG. 12, for each of 27 grid points at evenly spaced coordinates in RGB space correction values can be found. In any case, a patch can be printed for some specified color signals, and table parameters can be created based on the correction values obtained from that patch. By doing so, when actually printing an image, it is possible to perform interpolation from a plurality of scattered parameter information and prepare parameters that correspond to the desired signal values.

The explanation of the series of application processes described above was based on the premise that the processing is performed by the host PC 300 in FIG. 2; however, the processing of steps S501 to S507, for example, could be performed by a external PC instead of the host PC 300.

As described above, in the present invention, RGB signal values are inputted to and outputted from the MCS processing unit 404. An inkjet printing apparatus that performs control using RGB signal values has three unique merits as will be explained below.

The first merit is that it is possible to reduce the data capacity. When processing is performed using ink color signals, at least four signal values for CMYK are necessary. Generally, in a line inkjet printing apparatus, there is additionally light cyan (Lc) that is lighter than C, and light magenta (Lm) that is lighter than M. So in this case, ink for six colors, or in other words, six signal values are necessary. Furthermore, depending on the inkjet printing apparatus there are inks such as gray (Gr), red (R) and green (G), so together with these, there are nine ink colors all together. As was described above, in the MCS processing unit 404, processing is performed using a LUT, so that when performing processing according to ink color signals, the combinations of color signals, or in other words, the amount of data increases enormously. In an inkjet printing apparatus, the produced colors differ according to the permeation of ink, and the color characteristics become nonlinear. Therefore, it also becomes necessary to narrow the spacing between grid points of the three-dimensional LUT, and as a result, the number of grid points increases. As described above, when the number of colors (number of dimensions) increases, the number of grid points increases exponentially. In addition, in the MCS processing unit 404, because table parameters are stored for each nozzle area, the system load is further increased. For example, an 8-bit (1 Byte) signal value LUT will be considered. When 17 grid points are prepared for one color, the RGB LUT requires $17^3 = 4,913$ points, so the LUT becomes 1 Byte×3 signal values×4913 points=approximately 15 k Bytes. Incidentally, in the case of four colors CMYK, the LUT requires $17^4 = 83,521$ points, so that 1 Byte×4 signal values×83,521 points=approximately 334 kBytes is necessary. In other words, by increasing the number colors by just one color, in the example above, the amount of increases 22 times. In the case that there are 100 nozzle areas, the CMYK four-dimensional LUT finally has a data amount of approximately 33 MBytes. The present invention is technology for controlling ink ejection, and directly controlling the ink color signal is feasible; however, in this embodiment, taking into consideration the merit of reducing the amount of data, the MCS processing unit 404 performs processing using three RGB signal values.

The second merit is being able to avoid unanticipated situations due to saturation of the ink amount. When the LUT for the ink color signals is changed by this processing, permeation of the ink into the printing medium is affected. In an inkjet printing apparatus, the ejecting amount of ink is set according to the printing medium. However, when performing the second test print in step S505, the ink color signal value is changed more than a conventional value by the patch, and there is a possibility that the amount of ink will exceed the saturation amount for the printing medium. As a result, the printing medium is outputted from the printer with the ink that is printed on the printing medium being less dry than normal. By this happening, the user's hands may become ink stained, or the internal parts of the inkjet printing apparatus may become ink stained causing the sensors to stop operating properly, and thus cause the printer to malfunction. Therefore, this problem can be avoided by controlling the independent RGB signal values more than the CMYK signal values that control the amount of ink ejection. In this embodiment, in order that a state such as described above does not occur accidentally, the processing by the MCS processing unit 404 is performed using three components of the RGB signal.

Figure 13:
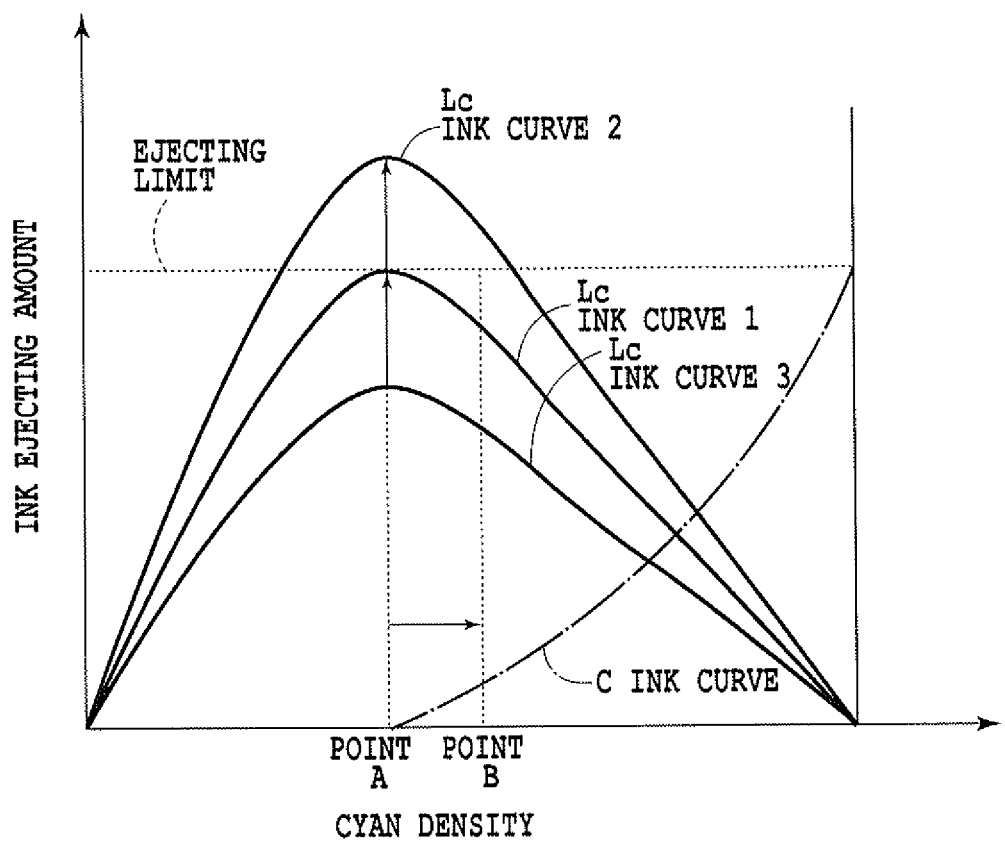
FIG. 13 is a graph illustrating a relationship between an ink driving amount and a density of a cyan hue.

The third merit is being able to reduce graininess in a printed image. As an example, the amount of ink used in the gradation from a density value of 0 in the cyan color phase to the maximum cyan density value (from light cyan to dark cyan) is considered. In FIG. 13, the ejecting curve for Lc ink is represented by 'Lc ink curve 1', and the ejecting curve for C ink is represented by 'C ink curve'. The ejecting of Lc ink starts from a state of 0 density, and the printed amount is gradually increased. Continuing, the amount of Lc ink printed begins to be reduced and the amount of ejecting of C ink is increased by that reduced amount. In this way, it is possible to reproduce the cyan gradation. When doing this, by ejecting C ink in the state where the amount of ejecting of LC ink has reached a limit (saturation amount), or in other words, in the state where the cyan color is darkened by Lc ink, it is possible to reduce graininess. This kind of inkjet printing apparatus characteristic has the effect of reducing the graininess more the greater the amount Lc ink is used. Here, in the present invention, in the second test print of step S505, a patch is printed for which the density has been changed with respect to the color patch specified in step S503. However, in doing this, when the color patch that was specified in step S503 is point A in FIG. 13, in order to create a patch having higher density than that using CMYK signal values, the amount of ejecting of Lc ink must be increased from 'Lc ink curve 1' to 'Lc ink curve 2'. In addition, at this point, the ejecting amount exceeds the limit. So, in the opposite manner, in order to prevent saturation of the ejecting amount while changing the amount of ink ejecting, the amount of ejecting of Lc ink must be decreased in advance. In other words, the amount of ejecting must be as 'Lc ink curve 3'. Incidentally, in 'Lc ink curve 3' the amount of Lc ink used is small, and graininess becomes noticeable. Here, as a merit of the present invention, taking into consideration the merit of reducing graininess, the second test print is created using 'Lc ink curve 1' using RGB signal values instead of CMYK values. When creating a color correction patch, by exchanging point A and point B, for example, it is possible to create the second test print without changing the ink ejecting conditions.

(Variation 1)

FIG. 4B is a block diagram related to this embodiment and illustrates a different example of the construction of the image processing units of an inkjet printing apparatus. In FIG. 4B, the units indicated by reference numbers 401 and 405 to 409 are the same as the respective parts indicated by the same reference numbers in FIG. 4A, so that explanations of those units are omitted. This variation differs from the construction illustrated in FIG. 4A in that the input color conversion processing unit and MCS processing unit are integrated into one processing unit. In other words, the input color conversion processing unit and MCS processing unit 411 of this variation is a processing unit having both an input color conversion unit processing function and MCS processing function.

More specifically, the input color conversion processing and MCS processing unit 411 uses one table that is a combination of a table for the input color conversion processing unit and a table for the MCS processing unit. That is, this table is used for performing color correction processing of the color signals of sRGB color space, as well as for converting color signals to color signals of an RGB color space that is different from the sRGB color space. By doing so, it is possible to directly perform correction of uneven color on inputted image data from the input unit 401, and output device image data for which the uneven color has been reduced.

Figure 14:
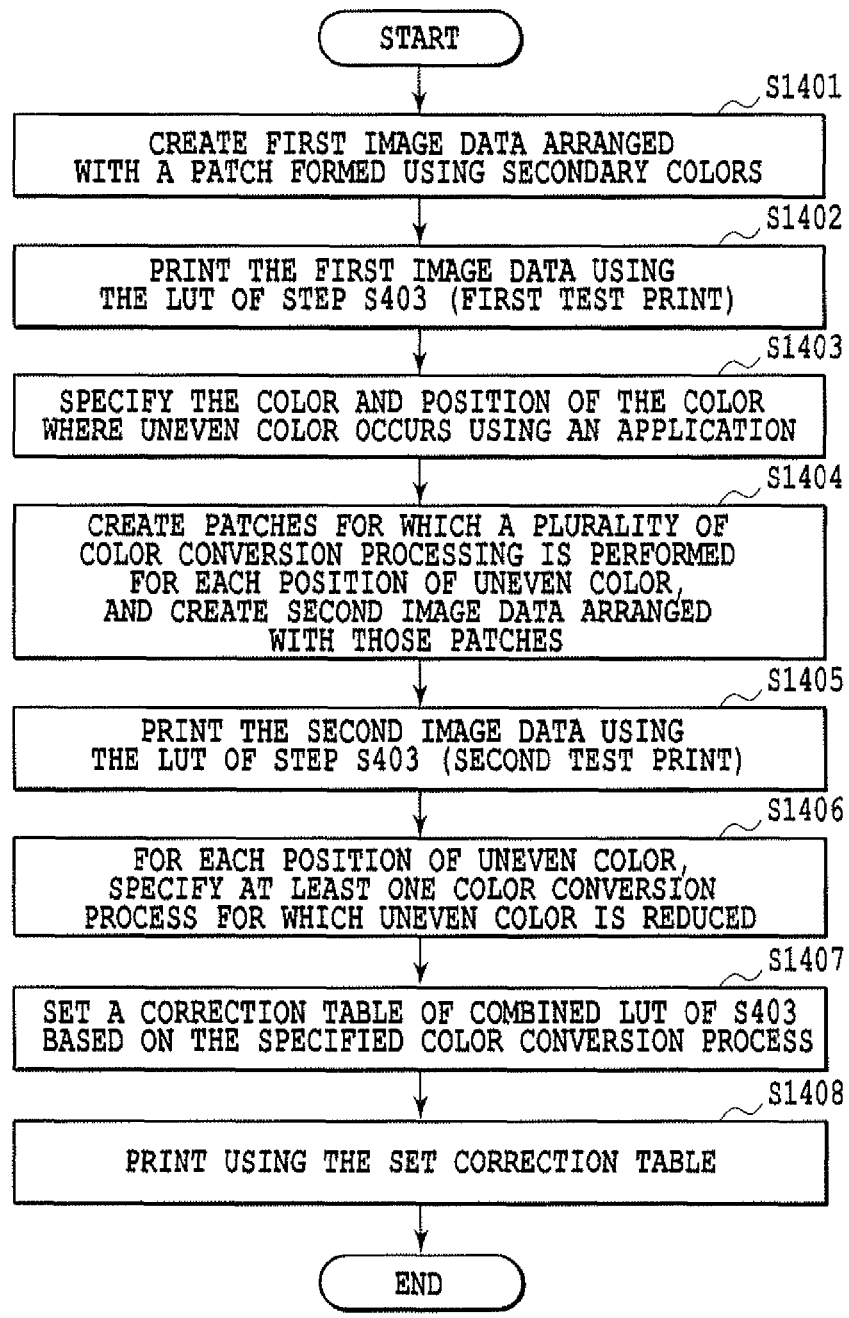
FIG. 14 is a flowchart illustrating both processing for generating parameters of a table used in the MCS processing section illustrated in FIG. 4B, and processing using the above table by the MCS processing section in the image processing upon generation of printing data.

FIG. 14 is a flowchart illustrating the process of generating parameter data for the table used by the input color conversion processing and MCS processing unit 411, and MCS processing that uses that table in image processing when generating printing data.

FIG. 14 is a process that the CPU 311 executes for generating parameters for a three-dimensional LUT. This flowchart differs from the flowchart in FIG. 5 by the processing of step S1402, step S1405 and step S1407.

In step S1402 the LUT that is used in the input color conversion process and the LUT that is used by the MCS processing unit 411 are combined. In this way, as in the first embodiment, data passes through the ink color conversion processing unit 405, HS processing unit 406, TRC processing unit 407 and quantization processing unit 408, and is printed by the output unit 409 onto printing paper 106 as a test color image.

In steps S1405 and S1407, the LUT that is used in the input color conversion process and the LUT that is used by the MCS processing unit 411 are combined.

With the first variation explained above, the same processing as performed in the first embodiment is performed by the input color conversion processing and MCS processing unit 411 using the combined LUT, so that it is possible to reduce uneven color as in the first embodiment. In addition, conversion is performed all together using one LUT, so that the area prepared for the LUT is reduced from that in the first embodiment, and the processing speed can be improved.
(Variation 2)

FIG. 4C is a block diagram illustrating the construction of image processing units of a second variation of the embodiment.

Generating table parameters for the MCS processing unit of this variation, and the processing by the MCS processing unit are the same as in FIG. 5, the difference being that the processing by the MCS processing unit 404 is performed before the processing by the input color conversion processing unit 403. By doing so, independence of the modules is improved. For example, the MCS processing unit can be provided as an expanded feature to an image processing unit not having such a feature. Moreover, processing could also be moved to the host PC side.
(Variation 3)

FIG. 4D is a block diagram illustrating the construction of image processing units of a third variation. As illustrated in FIGS. 3A to 3C, this variation is a form in which the HS processing unit 406 prepared in FIGS. 4A to 4C is omitted.

Generating table parameters for the MCS processing unit of this variation, and the processing by the MCS processing unit are the same as in FIG. 5, the difference being that head shading is not performed by the HS processing unit. In other words, in this variation, the table parameters for the MCS processing unit are not generated based on data after the HS processing as in the embodiment and variations described above. In this variation, generation of table parameters for the MCS processing unit and image processing are performed according to the flowchart illustrated in FIG. 5.

Figure 15A:
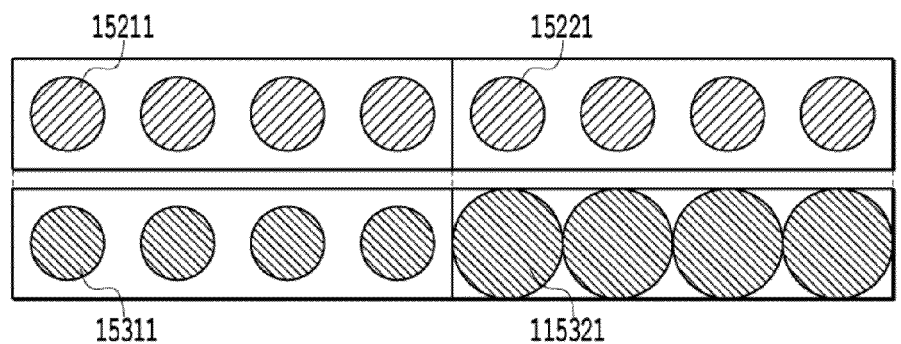
FIGS. 15A and 15B are diagrams for describing an example of images after the processing by the MCS processing section illustrated in FIG. 4D.
Figure 15B:
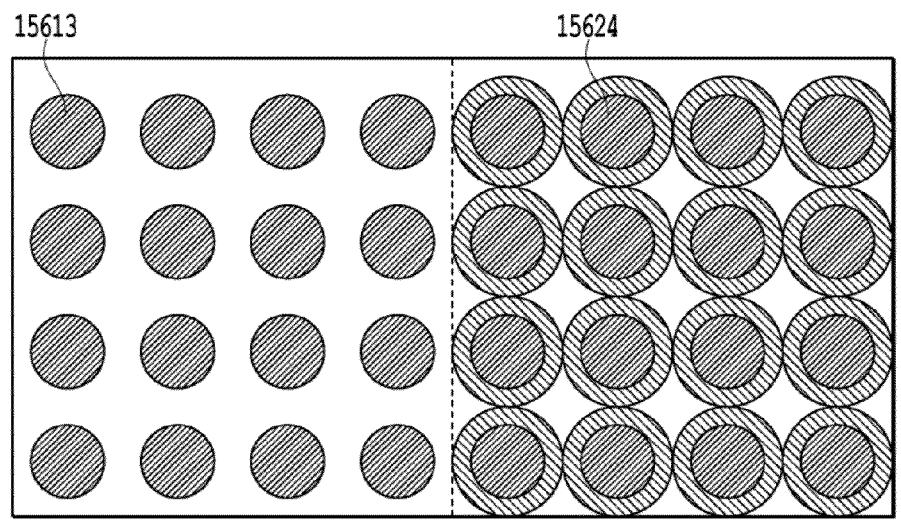

FIGS. 15A and 15B are drawings for explaining printed states of test color images of this variation. FIG. 15A is similar to the example illustrated in FIG. 3A, and illustrates an example in which of the nozzles of the magenta printing head 103, the four nozzles corresponding to the second area have an ejection amount greater than the standard amount. In this variation, HS processing is not performed on image data that expresses blue (K, C, M, Y)=(0, 255, 255, 0), so that a blue test color image is printed as illustrated in FIG. 15B. In other words, even in the second area that includes nozzles having an ejection amount that is greater than the standard amount, the same numbers of magenta and cyan dots are printed. As a result, in the second area, color displacement from magenta occurs.

As a result of measuring this kind of patch, table parameters for the MCS processing unit 404 of this variation generate correction values that will reduce the magenta color. By performing this kind of correction, even in this variation that does not include a HS processing unit, it is possible to obtain the printed state as illustrated in FIG. 11B when printing blue data, and it is possible to reduce color displacement.

Moreover, in this variation that does not have a HS processing unit, it is not necessary to prepare a table for HS processing, and thus it is not necessary to perform processing such as 'pattern printing', 'color measurement' and 'correction parameter calculation' for HS processing. As a result, the amount of memory used and the time cost related to the HS processing can be reduced.

A first embodiment and first to third variations have been explained; however, the processing of these are only examples, and as long as construction is such that the effect of the present invention of reducing uneven color can be achieved, any construction can be used. For example, as long as it is possible to reduce relative uneven color among areas, uneven color, which is the problem the present invention solves, becomes unnoticeable, so that it is not necessary to perform correction of all uneven color such that the colors becomes close to that of surrounding areas where there is no uneven color. For example, correction can be performed so that all of the areas inside a patch may become an arbitrary desired color.

In addition, in the embodiment described above, the area specified by the four nozzles was taken to be one area, and was set as the smallest unit for which MOS processing is performed; however, of course, the present invention is not limited to this kind of unit. An area specified by more nozzles can be taken to be one unit, or MCS correction could also be performed for one nozzle at a time. Moreover, the number of nozzles that are included in each individual area does not necessarily need to be the same number, and the number of nozzles that are included in each individual area can be suitably set according to the device characteristics.

Furthermore, in the embodiment described above, an example was explained in which after MCS processing was performed on image data that was inputted in RGB format, the data was converted to image data in CMYK format that corresponds to the ink colors used by a printing apparatus; however, of course the present invention is not limited to this form. In addition to image data in RGB format, the image data that is the object of MCS processing can be any format such as L*a*b, Luv, LCbCr, LCH and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-0225748, filed Oct. 5, 2010, which is hereby incorporated by reference herein in its entirety.

What is claimed is:

1. An image processing apparatus that performs color correction processing of a color signal that is associated with each pixel of image data to be printed on a printing medium and includes a plurality of components in a predetermined color space, the image processing apparatus comprising:
- a memory configured to store a conversion table having a plurality of table parameters, each of the table parameters being assigned for each of a nozzle or a predetermined number of nozzles used for printing in a common region of the printing medium in a plurality of nozzle arrays, respectively, the plurality of nozzle arrays ejecting a plurality of inks including a first ink and a second ink having a different color from the first ink;
- a correction unit configured to perform the color correction processing for the color signal using at least one of the table parameters assigned to a nozzle corresponding to the color signal of the each pixel;
- a first output unit configured to output a signal that causes the plurality of nozzle arrays to eject at least both of the first and second inks in a common region of the printing medium so as to print a test color image;
- a first reception unit configured to receive information on a color correction region to be subjected to color correction in the test color image, the information being based on a result of the output of the test color image output by the first output unit;
- a generation unit configured to generate a plurality of correction candidate values used for the color correction processing for at least one of the color signals corresponding to the color correction region in the test color image;
- a second output unit configured to output a signal that causes the plurality of nozzle arrays to print a plurality of different color correction images on the printing medium, the plurality of different color correction images being subjected to a plurality of different types of color correction processing with use of the plurality of correction candidate values;
- a second reception unit configured to receive information on a color correction image selected from the plurality of different color correction images, the information being based on a result of the output of the plurality of different color correction images output by the second output unit; and
- a formation unit configured to form at least one of the table parameters based on the color correction processing corresponding to the selected color correction image, the at least one of the table parameter being assigned to a nozzle corresponding to the color correction region,
- wherein the first and second reception units display the test color image and a plurality of color correction images on a display unit, and receive information related to the color correction region and color correction processing via an input unit, and
- wherein the first and second reception units further display nozzle position information on the display unit, wherein the test color image and color correction images are associated with the nozzle position information.

2. The image processing apparatus according to claim 1, wherein the first and second output units output a signal for printing nozzle position information on the printing medium, wherein the information nozzle position is associated with the test color image and color correction images.

3. The image processing apparatus according to claim 1, wherein the input unit is capable of specifying the color correction region, as well as specifying a characteristic point inside the specified color correction region; and
- the second output unit sets a content of the plurality of different color correction processing based on the characteristic point.

4. The image processing apparatus according to claim 1, wherein the color correction region includes a region on the printing medium having different color caused by variation in ink ejection characteristics of nozzles when a color is formed by mixing at least the first and second inks.

5. The image processing apparatus according to claim 1, wherein the correction unit converts a first color signal in the specified color space to a second color signal in the same color space using the conversion table, wherein the image processing apparatus further comprises a conversion unit that converts the second color signal to a color signal that corresponds to the plurality of inks.

6. The image processing apparatus according to claim 5, wherein the first color signal and the second color signal are RGB signals.

7. The image processing apparatus according to claim 1, wherein the conversion table is used in the color correction processing on a color signal in the specified color space, and in the conversion of the color signal to a color signal in a color space different from the specified color space.

8. An image processing method that performs color correction processing of a color signal in a predetermined color space that is associated with each pixel of image data to be printed on a printing medium, the image processing method comprising the steps of:
- performing the color correction processing of the color signal with use of at least one of table parameters assigned to a nozzle corresponding to the color signal of the each pixel, the table parameters being assigned for each of a nozzle or a predetermined number of nozzles used for printing in a common region of the printing medium in a plurality of nozzle arrays, respectively, the plurality of nozzle arrays ejecting a plurality of inks including a first ink and a second ink having a different color from the first ink;
- outputting a signal that causes the plurality of nozzle arrays to eject at least both of the first and second inks in a common region of the printing medium so as to print a test color image;
- receiving information on a color correction region to be subjected to color correction in the test color image, the information being based on a result of the output of the test color image;
- generating a plurality of correction candidate values used for the color correction processing for the color signal corresponding to the color correction region in the test color image;
- outputting a signal that causes the plurality of nozzle arrays to print a plurality of different color correction images on the printing medium, the plurality of different color correction images being subjected to a plurality of different types of color correction processing with use of the plurality of correction candidate values;
- receiving information on a color correction image selected from the plurality of different color correction images, the information being based on a result of the output of the plurality of different color correction images; and
- forming at least one of the table parameters based on the color correction processing corresponding to the selected color correction image, the at least one of the table parameter being assigned to a nozzle corresponding to the color correction region,
- wherein the step of receiving information includes displaying the test color image and a plurality of color correction images on a display unit, and receiving information related to the color correction region and color correction processing via an input unit, and wherein the step of receiving information further includes displaying nozzle position information on the display unit, wherein the test color image and color correction images are associated with the nozzle position information.

9. An inkjet printer that causes a printing head with a plurality of nozzle arrays to scan a printing medium so as to print an image thereon, the plurality of nozzle arrays respectively ejecting a plurality of inks including a first ink and a second ink having a different color from the first ink, the inkjet printer comprising:
 a correction unit configured to perform color correction processing for a color signal using at least one of table parameters, the color signal being associated with each pixel of image data to be printed on the printing medium and including a plurality of components in a predetermined color space, the table parameters being assigned to each of a nozzle or a predetermined number of nozzles used for printing in a common region of the printing medium in a plurality of nozzle arrays, respectively, the at least one of table parameters being assigned to a nozzle corresponding to the color signal of the each pixel;
 a first output unit configured to output a signal that causes the plurality of nozzle arrays to eject at least both of the first and second inks in a common region of the printing medium so as to print a test color image;
 a first reception unit configured to receive information on a color correction region to be subjected to color correction in the test color image, the information being based on a result of the output of the test color image output by the first output unit;
 a generation unit configured to generate a plurality of correction candidate values used for the color correction processing of a color signal corresponding to the color correction region in the test color image;
 a second output unit configured to output a signal that causes the plurality of nozzle arrays to print a plurality of different color correction images on the printing medium, the plurality of different color correction images being subjected to a plurality of different types of color correction processing with use of the plurality of correction candidate values;
 a second reception unit configured to receive information on a color correction image selected from the plurality of different color correction images, the information being based on a result of the output of the plurality of different color correction images output by the second output unit; and
 a formation unit configured to form at least one of the table parameters based on the color correction processing corresponding to the selected color correction image, the at least one of the table parameter being assigned to a nozzle corresponding to the color correction region,
 wherein the first and second reception units display the test color image and a plurality of color correction images on a display unit, and receive information related to the color correction region and color correction processing via an input unit, and
 wherein the first and second reception units further display nozzle position information on the display unit, wherein the test color image and color correction images are associated with the nozzle position information.

10. An image processing apparatus that performs color correction processing of a color signal that is associated with each pixel of image data to be printed on a printing medium and includes a plurality of components in a predetermined color space, the image processing apparatus comprising:
 a memory configured to store a conversion table having a plurality of table parameters, each of the table parameters being assigned for each of a nozzle or a predetermined number of nozzles used for printing in a common region of the printing medium in a plurality of nozzle arrays, respectively, the plurality of nozzle arrays ejecting a plurality of inks including a first ink and a second ink having a different color from the first ink;
 a correction unit configured to perform the color correction processing for the color signal using at least one of the table parameters assigned to a nozzle corresponding to the color signal of the each pixel;
 a first output unit configured to output a signal that causes the plurality of nozzle arrays to eject at least both of the first and second inks in a common region of the printing medium so as to print a test color image;
 a first reception unit configured to receive information on a color correction region to be subjected to color correction in the test color image, the information being based on a result of the output of the test color image output by the first output unit;
 a generation unit configured to generate a plurality of correction candidate values used for the color correction processing for at least one of the color signals corresponding to the color correction region in the test color image;
 a second output unit configured to output a signal that causes the plurality of nozzle arrays to print a plurality of different color correction images on the printing medium, the plurality of different color correction images being subjected to a plurality of different types of color correction processing with use of the plurality of correction candidate values;
 a second reception unit configured to receive information on a color correction image selected from the plurality of different color correction images, the information being based on a result of the output of the plurality of different color correction images output by the second output unit; and
 a formation unit configured to form at least one of the table parameters based on the color correction processing corresponding to the selected color correction image, the at least one of the table parameter being assigned to a nozzle corresponding to the color correction region,
 wherein the first and second reception units display the test color image and a plurality of color correction images on a display unit, and receive information related to the color correction region and color correction processing via an input unit, and
 wherein the input unit is capable of specifying the color correction region, as well as specifying a characteristic point inside the specified color correction region; and the second output unit sets a content of the plurality of different color correction processing based on the characteristic point.

11. An image processing apparatus that performs image processing for printing an image on a printing medium by using a printing unit, the printing unit including a first nozzle array having a plurality of nozzles for ejecting a first ink onto a printing medium, which are arranged in a predetermined direction, and a second nozzle array having a plurality of nozzles for ejecting a second ink onto the printing medium, which are arranged in the predetermined direction, the image processing apparatus comprising:

a first printing control unit configured to cause the printing unit to (i) print a first image on a first area in the printing medium by ejecting at least the first and second ink from a first nozzle unit based on a color signal representing a predetermined color, wherein the first nozzle unit comprises predetermined number of nozzles of the first nozzle array and predetermined number of nozzles of the second nozzle array, and (ii) print a second image on a second area in the printing medium whose position in the predetermined direction is different from a position of the first area by ejecting at least the first and second inks from a second nozzle unit based on the color signal representing a predetermined color, wherein the second nozzle unit comprises predetermined number of nozzles of the first nozzle array and predetermined number of nozzles of the second nozzle array, the respective predetermined number of nozzles of the first and second nozzle arrays being different from the nozzles of the first nozzle unit, wherein a position of nozzles of the second nozzle unit in the predetermined direction is different from a position of nozzles of the first nozzle unit in the predetermined direction;

a first obtaining unit configured to obtain an information showing that a color correction to the first image is directed; and a second printing control unit configured to cause the printing unit to, in a case that the first obtaining unit obtains an information showing that the color correction to the first image is directed, print a plurality of color correction images which are used for specifying a first correcting color used for correcting the color signal for causing the first nozzle unit to perform printing, wherein each of the plurality of the color correction images is printed by ejecting ink from the first nozzle unit to a third area in a printing medium based on each of a plurality of correcting color signals representing each of a plurality of correcting colors obtained by the color corrections, which are different from each other, to the color signal representing a predetermined color, and by ejecting ink from the second nozzle unit to a fourth area in the printing medium whose position in the predetermined direction is different from a position of the third area based on the color signal representing a predetermined color without the color correction.

12. The image processing apparatus according to claim 11, further comprising:

a second obtaining unit configured to obtain an information showing the first correcting color which is specified among the plurality of the correcting colors based on the plurality of the color correction images printed by the second printing control unit; and a third printing control unit configured to cause the printing unit to print the predetermined color image on the printing medium by ejecting ink from the first nozzle unit to a fifth area in a printing medium based on a first correcting color signal representing the first correcting color whose information is obtained by the second obtaining unit, and ejecting ink from the second nozzle unit to a sixth area in the printing medium whose position in the predetermined direction is different from a position of the fifth area based on the color signal representing a predetermined color without the color correction.

13. The image processing apparatus according to claim 11, wherein the plurality of color correction images include images printed on the first area from the first nozzle unit based on the color signal representing a predetermined color without the color correction to the predetermined color.

14. The image processing apparatus according to claim 11, wherein the first print control unit is configured to cause the printing unit to print an information relating a position of the first nozzle unit in the predetermined direction adjacent the first image printed in the first region, and to print an information relating a position of the second nozzle unit in the predetermined direction adjacent the second image printed in the second region.

15. The image processing apparatus according to claim 11, wherein the second print control unit is configured to cause the printing unit to print an information relating a position of the first nozzle unit in the predetermined direction adjacent each of the plurality of color correction images printed in the first region.

16. The image processing apparatus according to claim 12, further comprising a display unit for displaying an information for receiving a direction of a color correction to the first image printed by the first print control unit.

17. The image processing apparatus according to claim 16, wherein the display unit is configured to display an information for receiving a direction of a color correction to the first and the second images,
   wherein the first obtaining unit is configures to obtain an information relating to a direction of a color correction to the first image which is selected by a user among information for receiving a direction of a color correction to the first and the second images displayed by the display unit.

18. The image processing apparatus according to claim 16, wherein the display unit is configured to display an information for a user to specify the correcting color among the plurality of correcting colors based on the plurality of color correction images printed by the second print control unit.

19. The image processing apparatus according to claim 18, wherein the second obtaining unit is configured to obtain an information relating to a specification of the correcting color based on an input of an information relating to the specification of the correcting color by a user.

20. The image processing apparatus according to claim 10, wherein a color development of the first image is different from that of the second image.

21. The image processing apparatus according to claim 11, wherein an image printed with the first nozzle unit based on a color signal representing a specified correcting color obtained by the second obtaining unit develops substantially a same color as that of the second image.

22. The image processing apparatus according to claim 11, wherein the color signal representing a predetermined color is an RGB signal.

23. The image processing apparatus according to claim 22, wherein the plurality of color signals representing a predetermined color, are RGB signals, respectively.

24. The image processing apparatus according to claim 23, further including a first conversion unit configured to convert an RGB signal representing a color of an image input to an RGB signal representing the predetermined color, and
   a second conversion unit configured to convert the RGB signal representing a predetermined color and RGB signals representing the plurality of correcting colors to signals representing a color of ink, respectively.

25. The image processing apparatus according to claim 24, wherein each of the signals representing the plurality of correcting colors are generated based on the RGB signal representing a predetermined color and a plurality of correction parameters different from each other, respectively.

26. The image processing apparatus according to claim 25, wherein each of the plurality of correction parameters is determined in accordance with the RGB signal representing a predetermined color.

27. The image processing apparatus according to claim 11, further comprising the printing unit.

28. An image processing method that performs image processing for printing an image on a printing medium by using a printing unit, the printing unit including a first nozzle array having a plurality of nozzles for ejecting a first ink onto a printing medium, which are arranged in a predetermined direction, and a second nozzle array having a plurality of nozzles for ejecting a second ink onto the printing medium, which are arranged in the predetermined direction, the image processing method comprising:
  (i) printing a first image on a first area in the printing medium by ejecting at least the first and second ink from a first nozzle unit based on a color signal representing a predetermined color, wherein the first nozzle unit comprises predetermined number of nozzles of the first nozzle array and predetermined number of nozzles of the second nozzle array, and (ii) printing a second image on a second area in the printing medium whose position in the predetermined direction is different from a position of the first area by ejecting at least the first and second color inks from a second nozzle unit based on the color signal representing a predetermined color, wherein the second nozzle unit comprises predetermined number of nozzles of the first nozzle array and predetermined number of nozzles of the second nozzle array, the respective predetermined number of nozzles of the first and second nozzle arrays being different from the nozzles of the first nozzle unit, wherein a position of nozzles of the second nozzle unit in the predetermined direction is different from a position of nozzles of the first nozzle unit in the predetermined direction;
  obtaining an information showing that a color correction to the first image is directed; and
  printing, in a case that obtaining an information showing that a color correction to the first image is directed, a plurality of color correction images which are used for specifying a first correcting color used for correcting the color signal for causing the first nozzle unit to perform printing, wherein each of the plurality of the color correction images is printed by ejecting ink from the first nozzle unit to a third area in a printing medium based on each of a plurality of correcting color signals representing each of a plurality of correcting colors obtained by the color corrections, which are different from each other, to the color signal representing a predetermined color, and by ejecting ink from the second nozzle unit to a fourth area in the printing medium whose position in the predetermined direction is different from a position of the third area based on the color signal representing a predetermined color without the color correction.

29. An image processing apparatus that performs image processing for printing an image on a printing medium by using a printing unit, the printing unit including a first nozzle array having a plurality of nozzles for ejecting a first ink onto a printing medium, which are arranged in a predetermined direction, and a second nozzle array having a plurality of nozzles for ejecting a second ink onto the printing medium, which are arranged in the predetermined direction, the image processing apparatus comprising:
  a first printing control unit configured to cause the printing unit to (i) print a first image on a first area in the printing medium by ejecting at least the first and second ink from a first nozzle unit based on a color signal representing a predetermined color, wherein the first nozzle unit comprises predetermined number of nozzles of the first nozzle array and predetermined number of nozzles of the second nozzle array, and (ii) print a second image on a second area in the printing medium whose position in the predetermined direction is different from a position of the first area by ejecting at least the first and second inks from a second nozzle unit based on the color signal representing a predetermined color, wherein the second nozzle unit comprises predetermined number of nozzles of the first nozzle array and predetermined number of nozzles of the second nozzle array, the respective predetermined number of nozzles of the first and second nozzle arrays being different from the nozzles of the first nozzle unit, wherein a position of nozzles of the second nozzle unit in the predetermined direction is different from a position of nozzles of the first nozzle unit in the predetermined direction;
  a first obtaining unit configured to obtain an information relating occasion of color unevenness in the first image; and
  a second printing control unit configured to cause the printing unit to, in a case that the first obtaining unit obtains an information showing that the color correction to the first image is directed, print a plurality of color correction images which are used for specifying a first correcting color used for correcting the color signal for causing the first nozzle unit to perform printing, wherein each of the plurality of the color correction images is printed by ejecting ink from the first nozzle unit to a third area in a printing medium based on each of a plurality of correcting color signals representing each of a plurality of correcting colors obtained by the color corrections, which are different from each other, to the color signal representing a predetermined color, and by ejecting ink from the second nozzle unit to a fourth area in the printing medium whose position in the predetermined direction is different from a position of the third area based on the color signal representing a predetermined color without the color correction.

* * * * *